United States Patent
Valiveti et al.

(10) Patent No.: US 12,224,800 B2
(45) Date of Patent: Feb. 11, 2025

(54) PROVIDING ACCESS TO CLIENT OVERHEAD WHILE TRANSPARENTLY TRANSMITTING THE CLIENT SIGNAL OVER MULTIPLE OPTICAL SUBCARRIERS

(71) Applicant: Infinera Corporation, San Jose, CA (US)

(72) Inventors: Radhakrishna Valiveti, Union City, CA (US); Rajan Rao, Fremont, CA (US); Vinod Narippatta, Bangalore (IN); Sharfuddin Syed, San Jose, CA (US); Parthiban Kandappan, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/705,057

(22) Filed: Mar. 25, 2022

(65) Prior Publication Data
US 2023/0198622 A1    Jun. 22, 2023

Related U.S. Application Data

(60) Provisional application No. 63/166,160, filed on Mar. 25, 2021.

(51) Int. Cl.
*H04B 10/27*  (2013.01)

(52) U.S. Cl.
CPC .................................. *H04B 10/27* (2013.01)

(58) Field of Classification Search
CPC ........................................................ H04B 10/27
USPC ............................................................ 398/58
See application file for complete search history.

(56) References Cited

U.S. PATENT DOCUMENTS

| | | | | |
|---|---|---|---|---|
| 7,120,111 B2* | 10/2006 | Hosler | ...................... | H04J 3/14 370/223 |
| 8,446,906 B2* | 5/2013 | Sprague | ................ | H04J 3/1652 370/395.51 |
| 9,236,969 B2* | 1/2016 | Valiveti | ................. | H04J 3/1652 |
| 2016/0142796 A1* | 5/2016 | Mukhopadhyay | .......................... | H04Q 11/0003 398/45 |

* cited by examiner

*Primary Examiner* — Kenneth N Vanderpuye

(57) ABSTRACT

A method includes receiving client data; extracting overhead data from the client data; mapping the client data into one or more frames, where each of the one or more frames has a frame payload section and a frame overhead section, where the client data is mapped into the one or more frames; inserting the overhead data into the frame overhead section of the one or more frames; transporting the one or more frames across a network by generating a plurality of optical subcarriers carrying the one or more frames; extracting the overhead data from the frame overhead section of the one or more frames; recovering the client data from the one or more frames; inserting the extracted overhead data into the recovered client data to create modified client data; and outputting the modified client data.

22 Claims, 24 Drawing Sheets

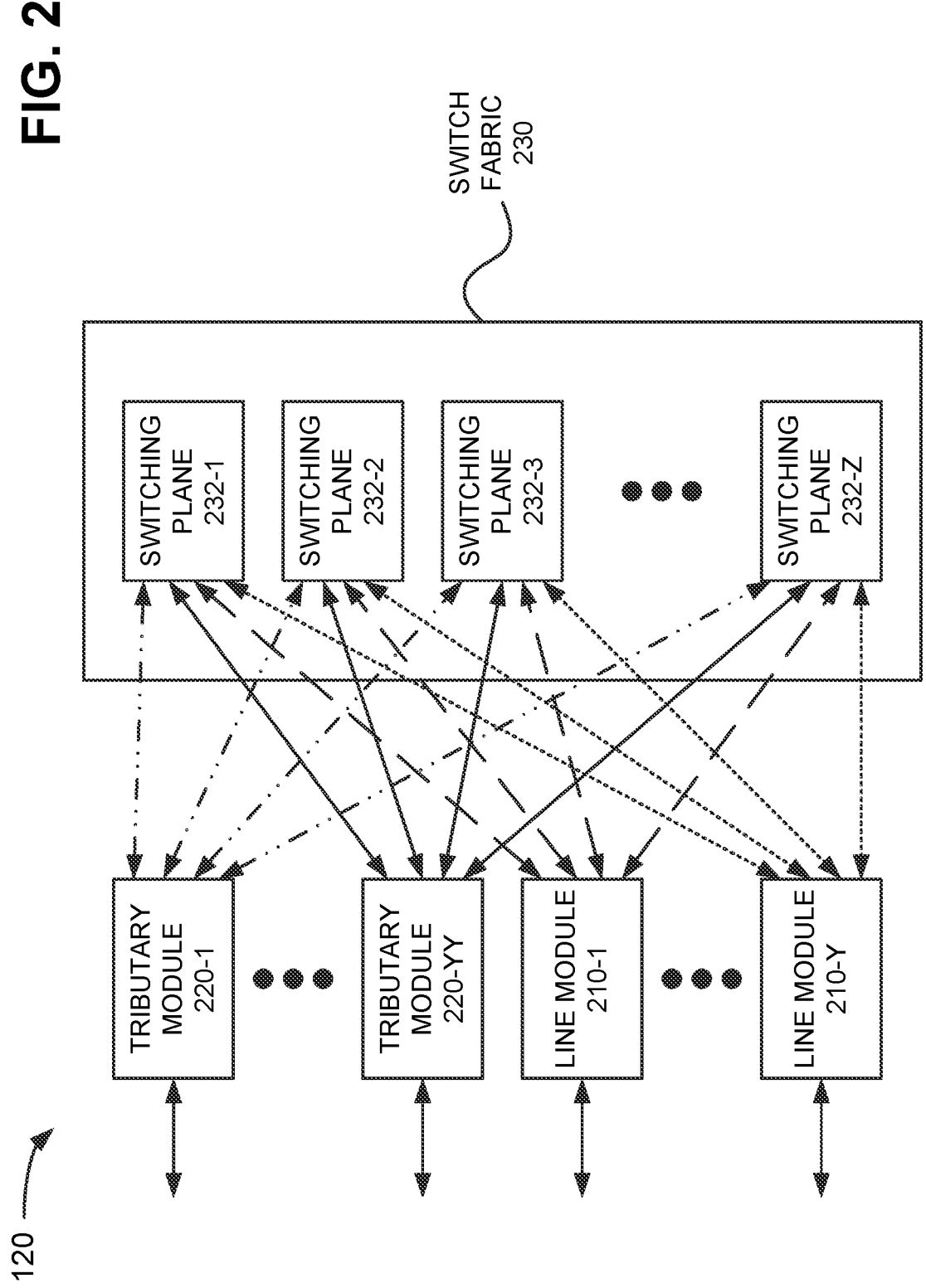

PROVIDING ACCESS TO CLIENT OVERHEAD WHILE TRANSPARENTLY TRANSMITTING THE CLIENT SIGNAL OVER MULTIPLE OPTICAL SUBCARRIERS

This application claims priority under 35 U.S.C. § 119 to U.S. Provisional Patent Application No. 63/166,160, filed on Mar. 25, 2021, the entire content of which is incorporated by reference herein in its entirety.

BACKGROUND

ITU-T defines an Optical Transport Network (OTN) as a set of optical elements that are connected by optical links and that are capable of providing transporting, multiplexing, switching, management, and supervision functionality and survivability of optical channels carrying client signals.

OTN uses digital wrapper technology that provides a method for encapsulating data in a frame, or optical data unit. Generally, digital wrapping involves grouping a number of existing frames together into one entity that can be more efficiently managed with a small allocation of overhead and forward error correction (FEC) bytes. There are three levels of hierarchy for the encapsulation: the optical channel payload unit (OPUk) for encapsulation of client data; the optical channel data unit (ODUk) for encapsulating the OPUk data; and the optical channel transport unit (OTUk) for encapsulating the ODUk data.

The following acronyms may be used herein:

Term Definition

CBR Constant Bit Rate
DSC Digital Subcarrier
DSCG Digital Subcarrier Group
DWDM Dense Wave Division Multiplexing
FEC Forward Error Correction
FRU Field Replaceable Unit
NE Network Element
Och Optical Channel
Ochr Optical channel—reduced functionality
ODUk Optical Channel Digital Unit-of rate k
ODUKV Vendor specific ODUk signal. ITU-T doesn't define this signal. The whole basis for the ITU standards is that vendors may use OTUKV on IaDI (intra-domain interfaces), but must use the standard OTUk interface at IrDI interfaces. But in all cases, there is only ODU signal format defined. INFN extends the format & functions of the standard ODU within the INFN network.
OMS Optical Multiplex Section
OPUk Optical Channel Payload Unit (with rate determined by k)
OPUk-Xv X virtually concatenated OPUks
OTUK Optical Channel Transport Unit (with rate k)
OTUKV Vendor specific OTUk signal. It is called a "functionally standardized" OTUk by ITU. In these cases, ITU-T only specifies the functions that are to be supported, but doesn't specify the frame format, rates etc. In other words, the exact bit sequence that is transmitted/received to/from a "wire" is not captured in the recommendations.
OTUC An OTUC signal has the same format as a OTU4 signal (without the FEC columns). It has a higher rate so that an ODU4 signal can be GMP mapped into a collection of OPUC tributary slots.
OTUCn An OTUCn signal is formed by interleaving n instances of OTUC signals. It has n instances of OH. Certain OH fields (e.g. STAT, TTI) are populated in the first OTUC instance; other OH fields such as BIP8/BEI/GCC are populated on all OTUC signal instances.
OTN Optical Transport Network
OTS Optical Transmission Section
OTSi Optical Tributary Signal
OTSIG Optical Tributary Signal Group
SNC Sub-network Connection
VCAT Virtual Concatenation
VCG Virtual Concatenation Group The OTN standard provides a method for adding management and intelligence to optical carriers, specifically wavelengths in dense wavelength division multiplexed (DWDM) systems. This methodology involves wrapping client information of any protocol in a frame and providing information about both the client and the optical carrier. The information can then be used to manage the optical signals.

For example, the operation of the OTN is described in terms of two broad layers—the digital and optical layers. Each of these broad categories is further decomposed into multiple layers, as described in G.709. The complete signal stack "on the wire" can be viewed as a vertical stacking.

Specifically, the digital & optical layers are composed of the following sub-layers:
  [Digital]: OTUk layer, ODUk layer, and lower-order ODUs multiplexed into the ODUk layer.
  [Optical]: Until G.709-2016, the optical layers on the DWDM are composed of these layers: Och, OMS, and OTS. Since then, G.709 and G.872 have evolved to cleanly separate the optical & digital layer networks and the equipment functions that apply at these layers. In addition, G.709 and G.872 allow digital signals (e.g. OTUk, OTUCn/FlexO), which are client layers for the optical layer, to be carried over a group of optical carriers (represented as OTSiG). In G.709-2016, each OTUk corresponds to one Och (and one carrier).

SUMMARY

Consistent with the present disclosure, a network is provided that comprises an ingress node configured to: receive client data, the client data including a client overhead section and a client payload section, copy data, as virtual overhead data, from the client overhead section of the client data, map the client data into a plurality of frames, each of the plurality of frames including a frame overhead section and a frame payload section, the frame payload section including the client data, and generate a plurality of optical subcarriers, each of which carrying information associated with each of the plurality of frames. In addition, an egress node is provided that is configured to: receive the plurality of optical subcarriers from the ingress node; extract the virtual overhead data from the information, recover the client overhead data based on the virtual overhead data, recover the client data, insert the recovered client overhead data into the client overhead section of the client data, and output the client data with the recovered client overhead data.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is a diagram of an exemplary node of FIG. 1;

DETAILED DESCRIPTION

Figure 1A:
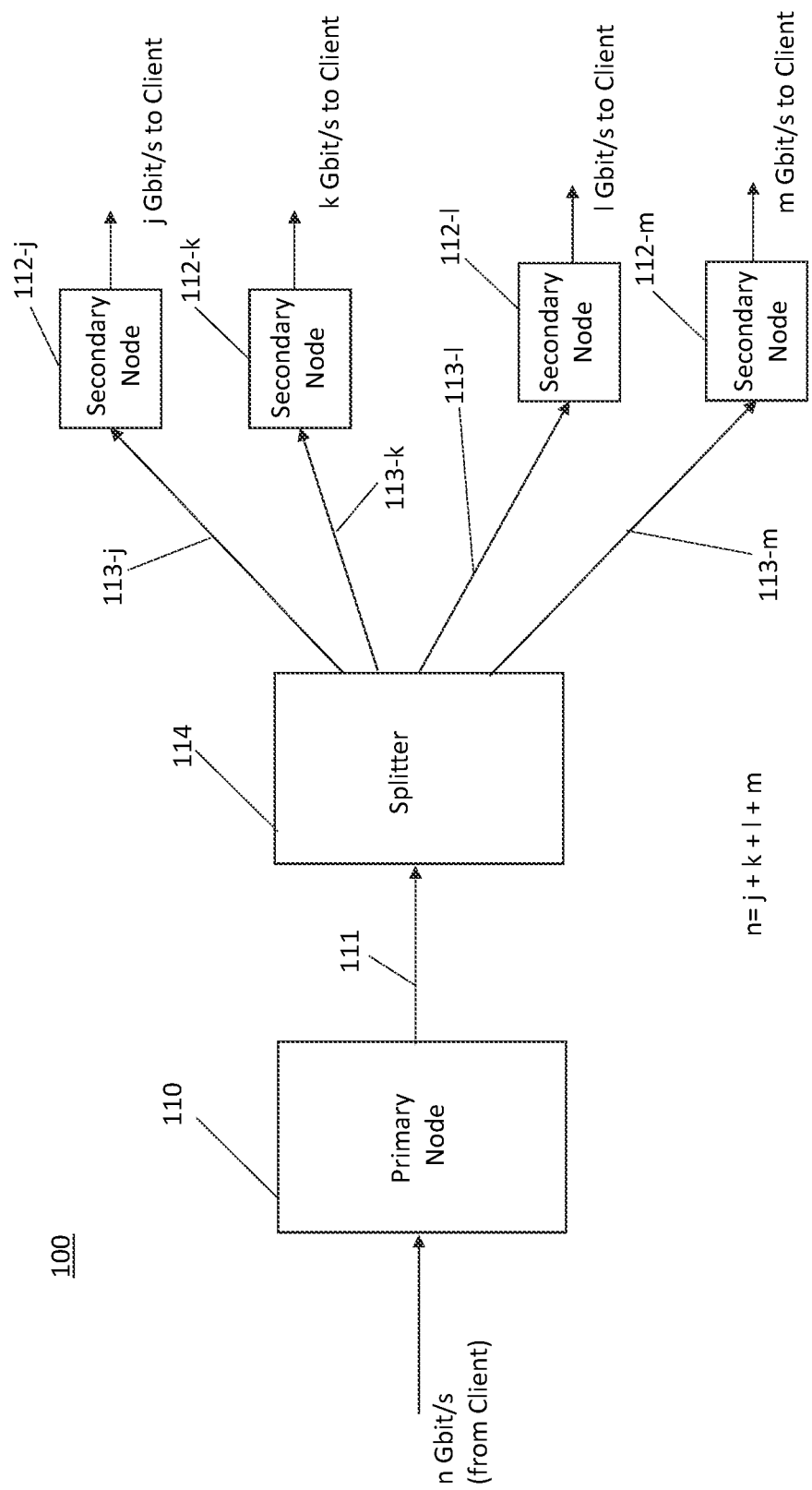
FIG. 1a-1c show examples of network architectures consistent with the present disclosure.

The following detailed description refers to the accompanying drawings. The same reference numbers in different drawings may identify the same or similar elements.

OTU signals with bitrates which are multiples of the bitrate supported by the carriers may be realized. Digital signal processors (DSPs) supporting modulation of two optical signal wavelengths, for example, and associated optical subcarriers can be transmitted with an aggregate capacity 800 Gbit/s. Other DSPs may support even higher bitrates. Moreover, optical networks can flexibly route portions of a carrier, such as optical subcarriers, by routing at the DSC level, as opposed to the entire carrier. This makes sub-rate OTUs (i.e. OTUs with rates which are a fraction of the bitrate supported by a single wave) attractive. Consistent with the present disclosure, OTU entities are associated with or realized over any appropriate number of DSC entities. This results in the automatic creation of the corresponding (High-order, subrate) ODU entity with the same rate as that of the subrate OTU (since the OTU frame doesn't include the FEC columns).

In one example, the optical subcarriers are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Preferably, arbitrary (and vendor proprietary) rates are supported, as well as multiple sub-rate OTU signals within a single wave (i.e., a group of subcarriers associated with a particular carrier), by allocating disjoint subsets of DSCs to each such OTU. In addition, sub-rate OTU signals can be carried by DSCs associated with more than one carrier.

Moreover, implementations, described herein, may provide a uniform transport mechanism for transferring a client signal through an optical network. Generally, at an ingress node within the optical network, client data of a client signal, of an arbitrary rate, may be asynchronously mapped into one or more first frames, called switching transport path (XTP) frames. In one implementation, the XTP frame is a structure of a particular, constant length, and a fixed rate, which is independent of the rate of the client signal.

Within a node, the XTP frame may also be asynchronously mapped into a second frame, called a switching transport format (XTF) frame. In one implementation, the XTF frame is a structure of a particular, constant length, and a fixed nominal rate, which is independent of the rate of the client signal and the rate of the XTP. The XTF frame may be optimized to carry one XTP frame or a group of XTP frames over an optical link of a particular signaling rate. The XTF frame may include error correction coding and/or other overhead that enables management, fault detection, and performance monitoring for an optical link. Optical subcarriers carrying XTF frames may be output from the node, whereby XTF frames (e.g., XTF frames having a lower rate than the rate associated with a carrier) are associated with each optical subcarrier. Typically, the payload carried by a subcarrier includes an integral multiple of XTF frames based on the capacity of the subcarrier.

At an egress node within the optical network, the XTP frames containing client data of the client signal may be concatenated. The client data may then be recovered from the XTP frames.

Implementations, described herein, may facilitate the transporting of client data of a client signal though an optical network in a manner in which the client data is transparent to the intermediate nodes in the optical network, but the client overhead data is available for processing by the intermediate nodes. For example, the ingress node may copy the client overhead data and insert the client overhead data into the overhead section of the XTP frame(s), while the original client data (including the original client overhead data) may be mapped into the payload section of the XTP frame(s). Thus, the intermediate nodes in the optical network may access and process the client overhead data even though the client data is transparently transported within the payload section of the XTP frame(s). The egress node may recover the client data from the XTP frame(s) and either discard the client overhead data from the XTP overhead section or replace the client overhead data from the client data with the client overhead data from the XTP overhead section.

Transparently transporting the client data within XTP frame(s) minimizes the complexity in the network. Intermediate nodes in the network may have access to the client overhead data of the client data, but need not recover the client data being transported in the XTP frames. As a result, the hardware and software logic at the intermediate nodes can be greatly simplified. Further, this may permit the network to be upgraded to support any arbitrary new client data type/frequency without requiring any changes to occur at the intermediate nodes.

These implementations may permit client data of any client signal, of any rate, to be asynchronously mapped into one or more frames (i.e., XTP frames) that are uniform throughout the nodes and the network. At different points on the links, internal or external to the nodes, one or more of these frames (i.e., XTP frames) may be asynchronously mapped to the link. For convenience (e.g., efficiency of the physical link), more than one of these frames (i.e., XTP frames) can be carried. Aside from performing mapping and recovery operations, the nodes in the network do not need to do anything different for client data of client signals of different types/rates. Rather, the nodes simply operate upon a uniform frame (i.e., the XTP frame).

The uniformity of the frames transmitted in the network may simplify the hardware and/or software in the nodes. It may also permit any empty slot on any wavelength to be filled with any part of a client signal (wrapped in an XTP frame) and, thus, avoids fragmentation.

While the description to follow will describe a technique for mapping client overhead data into the overhead section of a frame so that the client overhead data is available for processing by nodes of the network while transparently transporting client data of the client signal, there may be other reasons and/or other techniques for making the client overhead data available to nodes in the network. For example, rather than performing a dual mapping (e.g., mapping the client data into an XTP and mapping the XTP into an XTF), another form of mapping may be used. Also, rather than mapping the client overhead data into the overhead section of a frame, the client overhead data may be mapped elsewhere while still making that client overhead data available to nodes in the network. Further, XTF frames are carried by optical subcarriers, as opposed to a wavelength or carrier, such that the above described mapping may be carried out in a system whereby optical subcarriers are employed.

Exemplary Network

FIG. 1a illustrates an example of an aggregation network 100 consistent with the present disclosure in which primary node 110 may communicate with multiple secondary nodes 112-j to 112-m, which sometimes may be referred to individually or collectively as secondary node(s) 112. Secondary nodes 112, in one example, are remote from primary node 110. Primary node 110 may transmit optical subcarriers, described in greater detail below, in a downstream direction onto an optical communication path 111, which, like each of optical communication paths 113-j to 113-m, may include one or more segments of optical fiber, as well as one or more optical amplifiers, reconfigurable add-drop multiplexers (ROADMs) or other optical fiber communication equipment. Splitter 114 may be coupled to an end of optical communication path 111 to receive the optical subcarriers and provide a power split portion of each subcarrier to a corresponding one of secondary nodes 112-j to 112-m via a respective one of optical communication paths 113-j to 113-m.

As further shown in FIG. 1a, primary node 110 receives data from a client or multiple clients and has a data capacity to receive n Gbit/s of data (e.g., a data stream) for transmission to secondary node 112. Each secondary node 112 may receive and output to a client a portion of the data input to primary node 110. In this example, secondary nodes 112-j, 112-k, 112-l, and 112-m output j Gbit/s, k Gbit/s, l Gbit/s, and m Gbit/s of data (data streams), respectively, whereby the sum of the j, k, l, and m may equal n (where j, k, l, m, and n are positive numbers).

Client devices may include any type of network device, such as a router, a switch, or a central office, that may transmit data traffic. In one implementation, the client may transmit a client signal (e.g., a synchronous optical network (SONET) signal, a synchronous digital hierarchy (SDH) signal, an Ethernet signal, or another type of signal) to node 110. The client signal may conform to any payload type, such as Gigabit Ethernet (GbE), 2xGbE, Fibre Channel (FC), 1GFC, 10 GbE local area network (LAN) physical layer (Phy), 10 GbE wide area network (WAN) Phy, Synchronous Transport Mode 16 (STM-16), STM-64, Optical Carrier level 48 (OC-48), or OC-192.

Figure 1B:
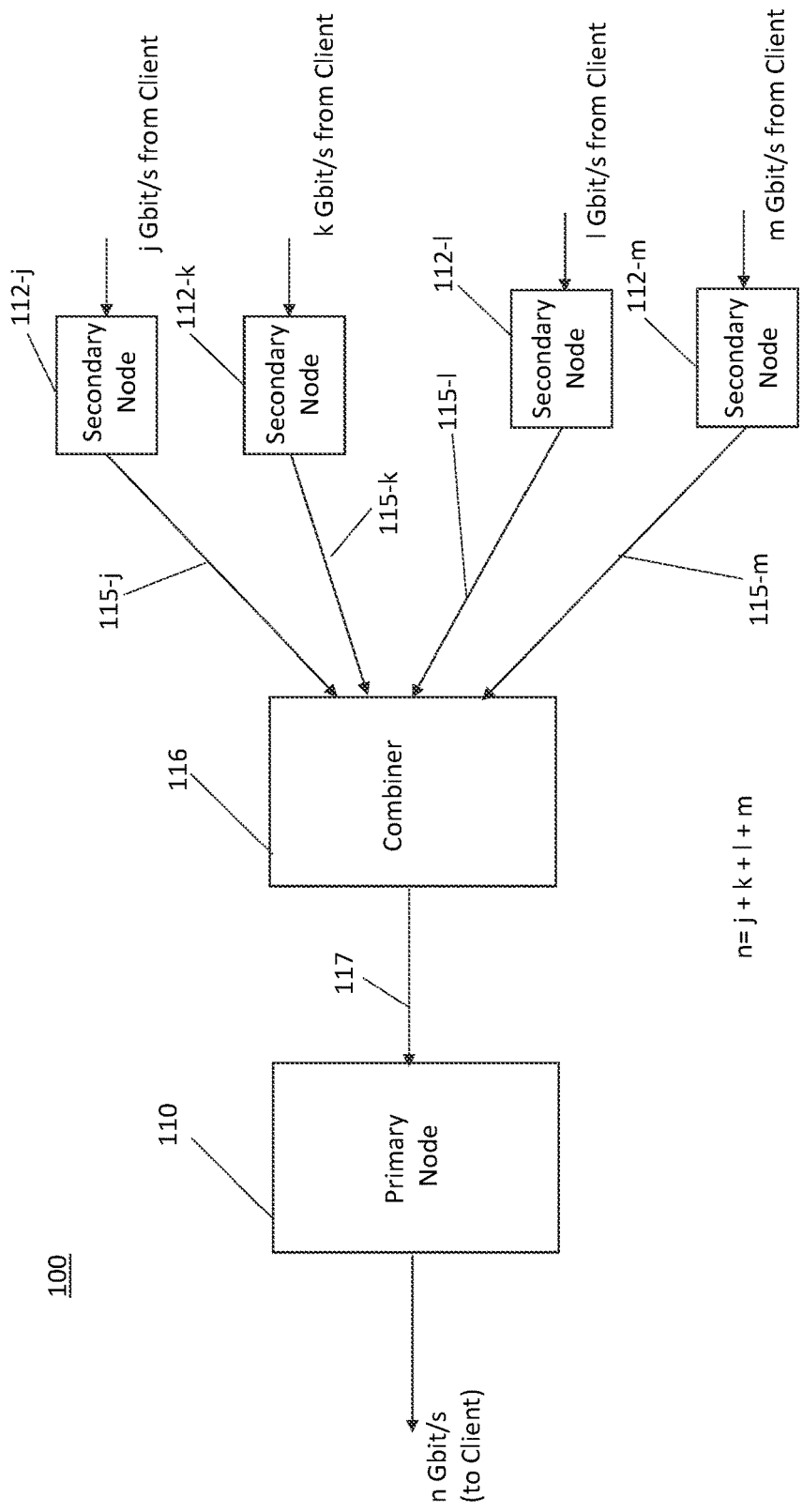

FIG. 1b shows transmission of additional subcarriers in an upstream direction from secondary nodes 112-j to 112-m to primary node 110. As further shown in FIG. 1b, each of secondary nodes 112-j to 112-m may transmit a corresponding group of subcarriers or one subcarrier to optical combiner 116 via a respective one of optical communication paths 115-1 to 115-m. Optical combiner 116 may, in turn, combine the received optical subcarriers from secondary nodes 112-j to 112-m onto optical communication path 117. Optical communication paths 115-1 to 115-m and 117 may have a similar construction as optical communication paths 111 and 112-1 to 112-m.

As further shown in FIG. 1b, each of secondary nodes 112-j to 112-m receives a respective data stream from a corresponding client and each data stream has a corresponding data rate of j Gbit/s, k Gbit/s, l Gbit/s, and m Gbit/s. At primary node 110, data contained in these streams may be output to one or more clients such that the aggregate data supplied by primary node 110 is n Gbit/s, such that, as noted above, n may equal the sum of j, k, l, and m.

In another example, subcarriers may be transmitted in both an upstream and downstream direction over the same optical communication path. In particular, selected subcarriers may be transmitted in the downstream direction from primary node 110 to secondary nodes 112, and other subcarriers may be transmitted in the upstream direction from secondary nodes 112 to primary node 110.

In some implementations, network 100 may include additional primary and/or secondary nodes and optical communication paths, fewer primary and/or secondary nodes and optical communication paths, or may have a configuration different from that described above. For example, network 100 may have a mesh configuration or a point-to-point configuration.

Figure 1C:
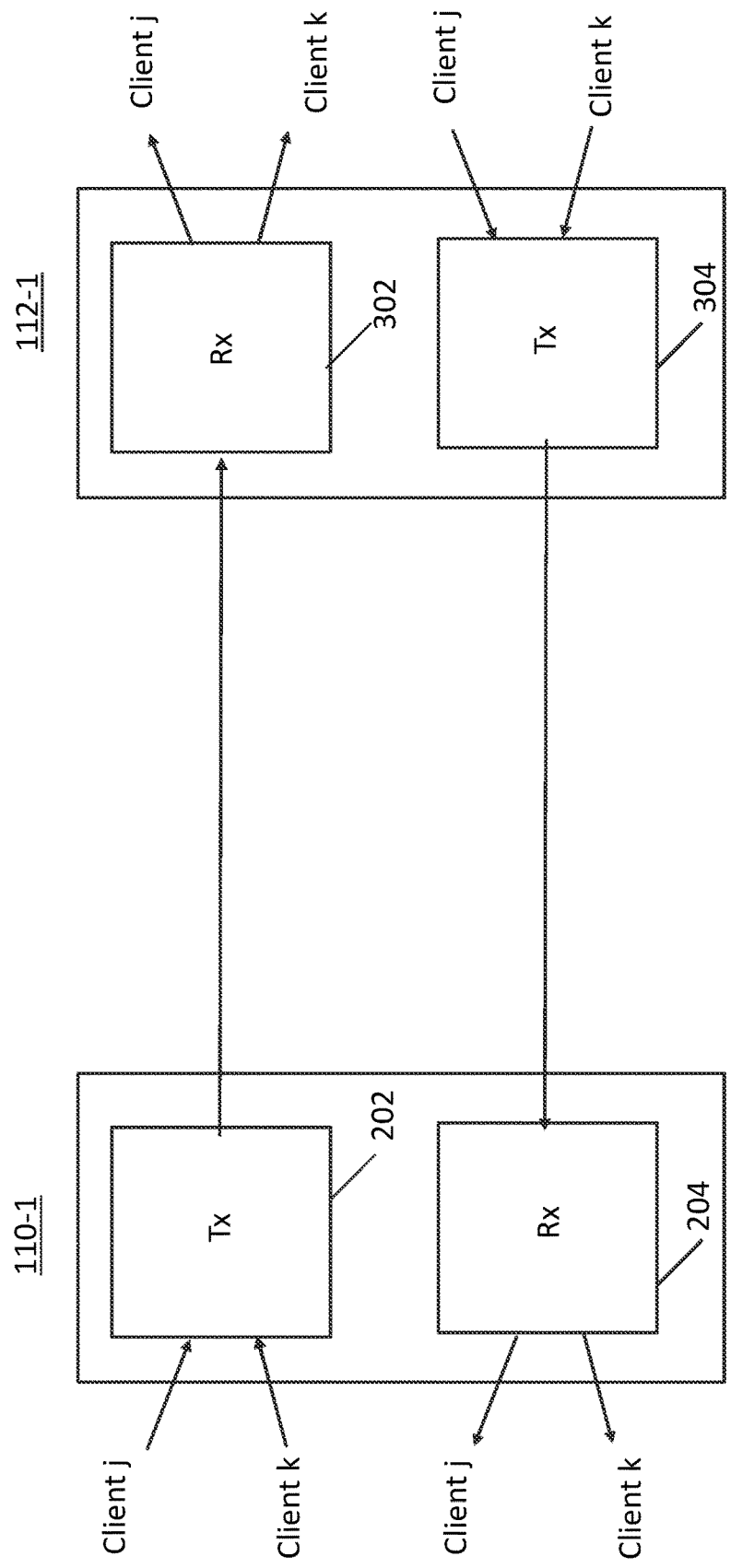

FIG. 1c shows an example of a "point-to-point" system whereby a first node 110-1 communicates with a second node 112-1. Node 110-1 may include a transmitter 202 that receives data from multiple clients (for example, clients j and k) and supplies a downstream modulated optical signal including subcarriers based on the received data. In addition, node 110-1 in this example includes a receiver that 204 that may receive upstream subcarriers originating from node 112-1. Data associated with such upstream carriers is provided to clients j and k.

FIG. 1c further shows a block diagram of nodes 112-1, which may include a receiver circuit 302 that receives one or more downstream transmitted subcarriers and supplies data associated with such subcarriers to clients j and k. Node 112-1 also has a transmitter circuit 304 that transmits optical subcarriers in the upstream direction based on data received from clients j and k.

In the above examples, nodes output optical subcarriers by modulating the optical signal output from a laser, i.e., a carrier. Thus, multiple optical subcarriers are associated with one laser. The present disclosure provides a mechanism by which ODU and OTU entities are assigned optical subcarriers. Conventional OTN entities are provided on a carrier basis, and do not support transmission of optical subcarriers. Rather, OTN entities are supported by optical subcarriers, which are lower in the signal hierarchy.

Exemplary Node Components

FIG. 2 is a diagram of exemplary components of node 110 or 112. As shown in FIG. 2, node 120 may include line modules 210-1, . . . , 210-Y (referred to collectively as "line modules 210," and generally as "line module 210") (where Y≥1) and tributary modules 220-1, . . . , 220-YY (referred to collectively as "tributary modules 220," and generally as "tributary module 220") (where YY≥1) connected to a switch fabric 230. As shown in FIG. 2, switch fabric 230 may include switching planes 232-1, 232-2, . . . 232-Z (referred to collectively as "switching planes 232," and generally as "switching plane 232") (where Z≥1). While FIG. 2 shows a particular number and arrangement of components, node 110 or 112 may include additional, fewer, different, or differently arranged components than those illustrated in FIG. 2. Also, it may be possible for one of the components of node 120 to perform a function that is described as being performed by another one of the components.

Line module 210 may include hardware components, or a combination of hardware and software components, that may provide network interface operations. Line module 210 may receive a multi-wavelength optical signal and/or transmit a multi-wavelength optical signal. A multi-wavelength optical signal may include a number of optical signals of different optical wavelengths. In one implementation, line module 210 may perform retiming, reshaping, regeneration, time division multiplexing, and/or recoding services for each optical wavelength.

Tributary module 220 may include hardware components, or a combination of hardware and software components, that may support flexible adding-dropping of multiple services, such as SONET/SDH services, GbE services, optical transport network (OTN) services, and FC services. Tributary modules 220 may perform functions, such as client data encapsulation and decapsulation. In one implementation, tributary modules 220 associated with an ingress node, may receive a stream of data, which may include client data, and asynchronously map the client data into one or more XTP frames. Tributary modules, 220 associated with an egress node, may receive an XTP frame (or a collection of XTP frames) and recover the client data from the XTP frame (or collection of XTP frames).

Switch fabric 230 may include hardware components, or a combination of hardware and software components, that may provide switching functions to transfer data between line modules 210 and/or tributary modules 220. In one implementation, switch fabric 230 may provide fully non-blocking transfer of data. Switch fabric 230 may be configured to switch with the granularity of a single XTP frame. Each switching plane 232 may be programmed to transfer data from a particular input to a particular output.

As shown in FIG. 2, each of line modules 210 may connect to each of switching planes 232. The connections between line modules 210/tributary modules 220 and switching planes 232 may be bidirectional. While a single connection is shown between a particular line module 210/tributary module 220 and a particular switching plane 232, the connection may include a pair of unidirectional connections (i.e., one in each direction). A connection from a line module 210/tributary module 220 to a switching plane 232 will be referred to herein as an "ingress switch link," and a connection from a switching plane 232 to a line module 210/tributary module 220 will be referred to as an "egress switch link."

Figure 3A:
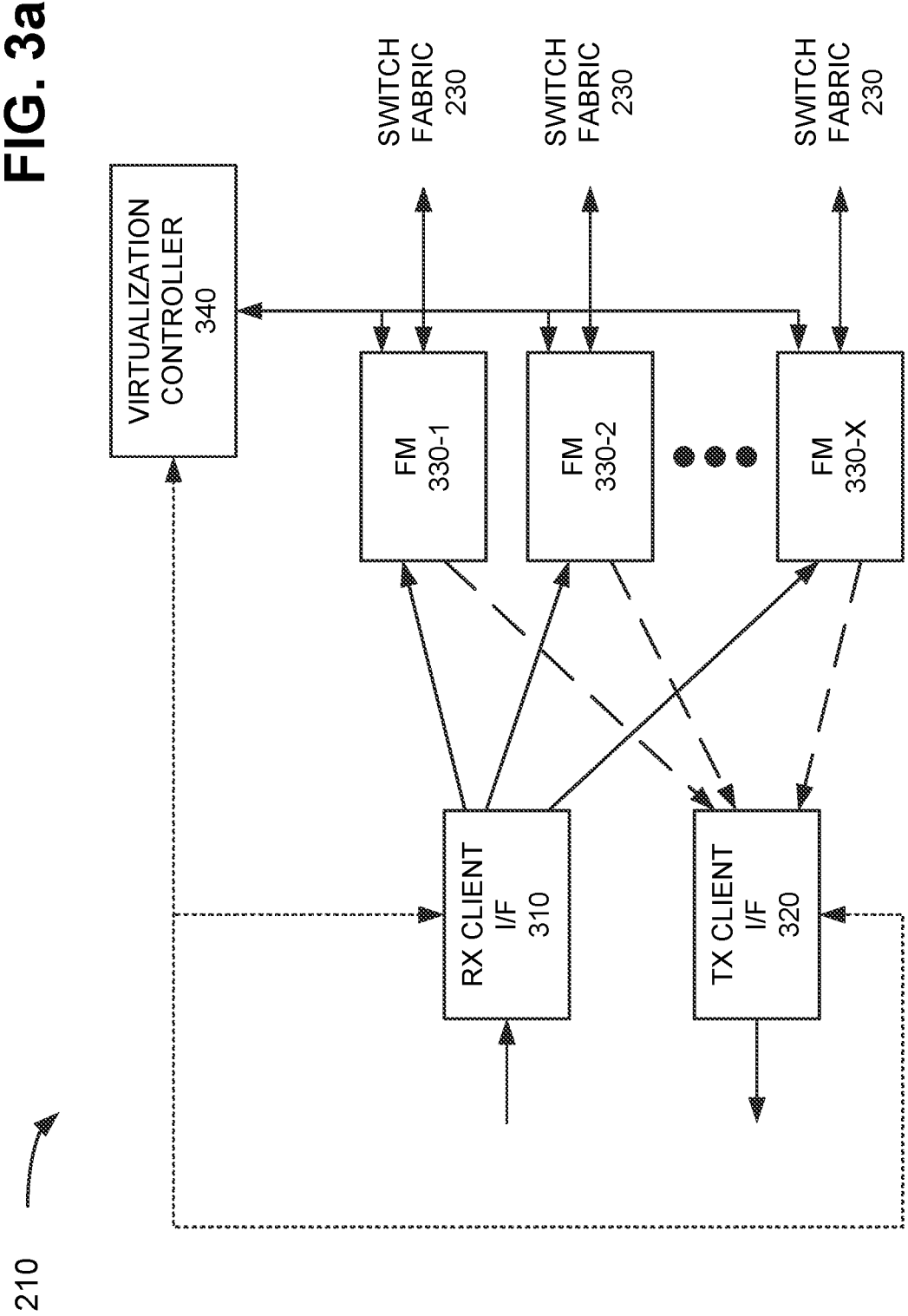
FIG. 3a is a diagram of exemplary components of a line module.

FIG. 3a is a diagram of exemplary components of a line module 210. As shown in FIG. 3a, line module 210 may include a receiver (RX) 310, a transmitter (TX) 320, fabric managers (FMs) 330-1, 330-2, . . . , 330-X (referred to collectively as "FMs 330," and generally as "FM 330") (where X≥1), and a virtualization controller 340. While FIG. 3a shows a particular number and arrangement of components, line module 210/tributary module 220 may include additional, fewer, different, or differently arranged components than those illustrated in FIG. 3a. Also, it may be possible for one of the components of line module 210 to perform a function that is described as being performed by another one of the components.

As noted above, line module 210 may include a receiver 310 and a transmitter 320. Receiver 310 may include hardware, or a combination of hardware and software, that may receive optical optical subcarriers and convert the received optical subcarriers to digital form. In one implementation, receiver 310 may include components, such as a photodetector, a demultiplexer, and/or an optical-to-electrical converter, as described in greater detail below. Transmitter 320 may include hardware, or a combination of hardware and software, that may convert signals from digital form, generate multiple optical subcarriers, and transmit the optical subcarriers. In one implementation, transmitter 320 may include components, such as an electrical-to-optical converter, and/or a laser, as well as other components or devices described in greater detail below.

Rx 310 may include hardware, or a combination of hardware and software, that may receive a client optical signal from a client 110. In one implementation, Rx may include components, such as a photodetector, a demultiplexer, and/or an optical-to-electrical converter. Rx may include hardware, or a combination of hardware and software, that may transmit a client optical signal to a client 110. In one implementation, Tx 320 may include components, such as an electrical-to-optical converter, a multiplexer, and/or a laser.

As shown in FIG. 3a, receiver 310 and transmitter 320 may connect to each of FMs 330 and/or virtualization controller 340. Receiver 310 may transfer data to FMs 330. Transmitter or 320 may receive data from FMs 330.

FM 330 may include hardware, or a combination of hardware and software, that may process digital signals for transmission to switching plane 232 or transmitter or client I/F 320. In one implementation, FM 330, associated with an ingress node, may receive a stream of data associated with a client signal, encapsulate the data in an XTP frame, and transmit the XTP frame to one or more switching planes 232. In one implementation, FM 330 may asynchronously map the XTP frame into another frame that is used to transmit the XTP frame through switch fabric 220 and recover the XTP frame from this other frame when received from switch fabric 220. FM 330 may also asynchronously map an XTP frame into an XTF frame for transmission, on an optical link, to another node, and recover an XTP frame from an XTF frame received, on an optical link, from another node. That is, XTF frames may be output from Rx 320 to one or more FMs 330 and one or more FMs 330 may supply XTF frames to Tx 310. As described in greater detail below, XTF frames may then be FEC encoded and subject to further processing in a DSP and analog circuitry to modulate an optical signal to output a plurality of optical subcarriers, each of which being associated with a respective XTF frame, as described in greater detail with respect to FIG. 3b.

Figure 3B:
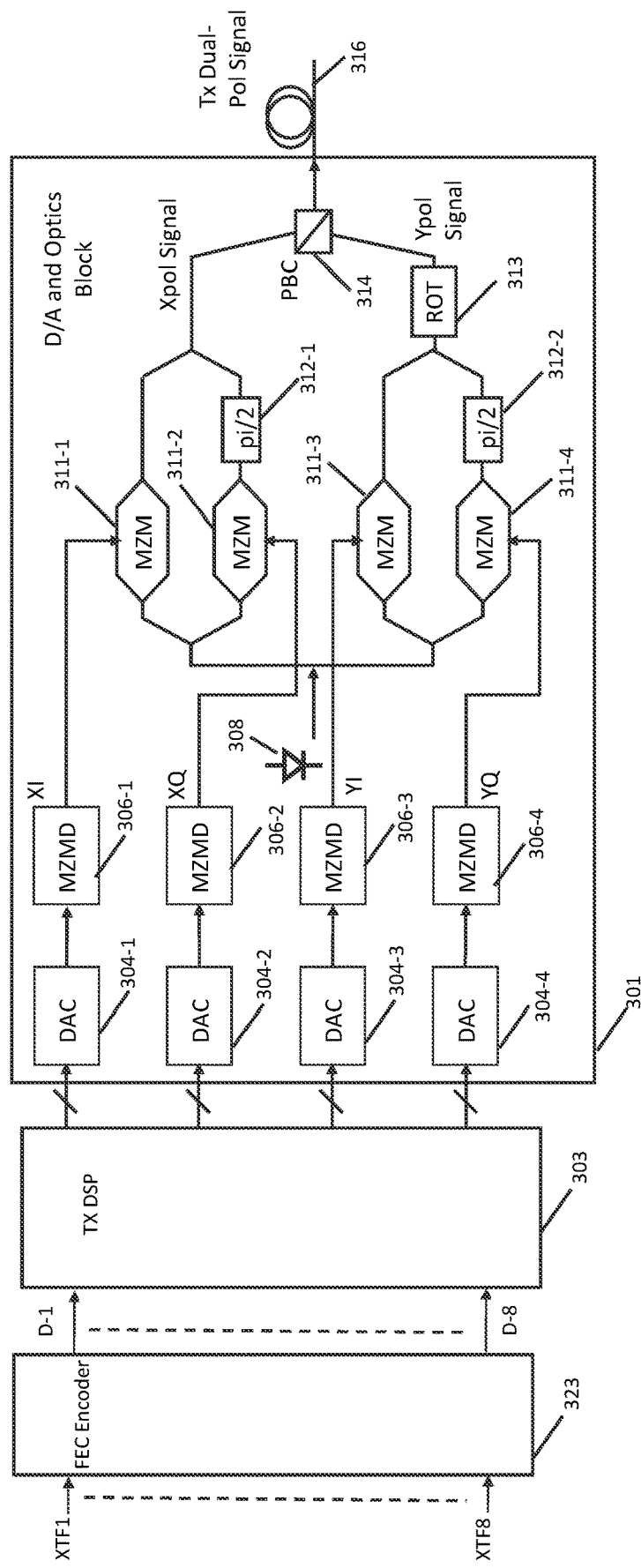
FIG. 3b is a diagram of an exemplary transmitter.

FIG. 3b illustrates transmitter (Tx) 310 in greater detail. Transmitter 310 includes a forward error correction (FEC) encoder, as well as a transmitter DSP (TX DSP) 302 and a D/A and optics block 301. XTF frames (XTF1 . . . . XTF8), in one example, are provided on respective inputs to FEC encoder circuit 323. In another example, separate FEC encoders may be provided, each of which FEC encoding a respective one of XTF frames XTF1 to XTF8. FEC encoder 323 FEC encodes frames XTF1 to XTF8, such as be generating appropriate parity bits or bytes. The encoded XTF outputs (D1 to D8) of encoder 323 are provided to DSP 303.

Based on the encoded outputs D1 to D8 of encoder 323, DSP 303 may supply a plurality of outputs to D/A and optics block 301 including digital-to-analog conversion (DAC) circuits 304-1 to 304-4, which convert digital signal received from DSP 303 into corresponding analog signals. An example of the structure and operation of DSP 303 is described in greater detail in U.S. Patent Application Publication No. 2020-0382216, the entire contents of which are incorporated herein by reference. In one example, DSP 303 generates groupings of digital signals, such that each grouping corresponds to a respective optical subcarrier output from Tx 310. Such digital signals may be referred to herein as digital subcarriers.

D/A and optics block 301 also includes driver circuits 306-1 to 306-2 that receive the analog signals from DACs 304-1 to 304-4 and adjust the voltages or other characteristics thereof to provide drive signals to a corresponding one of modulators 310-1 to 310-4.

D/A and optics block 301 further includes modulators 310-1 to 310-4, each of which may be, for example, a Mach-Zehnder modulator (MZM) that modulates the phase and/or amplitude of the light output from laser 308. As further shown in FIG. 3b, light output from laser 308, also included in block 301, is split such that a first portion of the light is supplied to a first MZM pairing, including MZMs 311-1 and 311-2, and a second portion of the light is supplied to a second MZM pairing, including MZMs 311-3 and 311-4. The first portion of the light is split further into third and fourth portions, such that the third portion is modulated by MZM 311-1 to provide an in-phase (I) component of an X (or TE) polarization component of a modulated optical signal, and the fourth portion is modulated by MZM 311-2 and fed to phase shifter 312-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 311-3 to provide an I component of a Y (or TM) polarization component of the modulated optical signal, and the sixth portion is modulated by MZM 311-4 and fed to phase shifter 312-2 to shift the phase of such light by 90 degrees to provide a Q component of the Y polarization component of the modulated optical signal.

The optical outputs of MZMs 311-1 and 311-2 are combined to provide an X polarized optical signal including I and Q components and are fed to a polarization beam combiner (PBC) 314 provided in block 301. In addition, the outputs of MZMs 311-3 and 311-4 are combined to provide an optical signal that is fed to polarization rotator 313, further provided in block 301, that rotates the polarization of such optical signal to provide a modulated optical signal having a Y (or TM) polarization. The Y polarized modulated optical signal also is provided to PBC 314, which combines the X and Y polarized modulated optical signals to provide a polarization multiplexed ("dual-pol") modulated optical signal onto optical fiber 316, for example, which may be included as a segment of optical fiber in optical communication path 111.

The polarization multiplexed optical signal output from D/A and optics block 301 includes, in one example, subcarriers SC1-SC8, such that each subcarrier has X and Y polarization components and I and Q components.

Figure 3C:
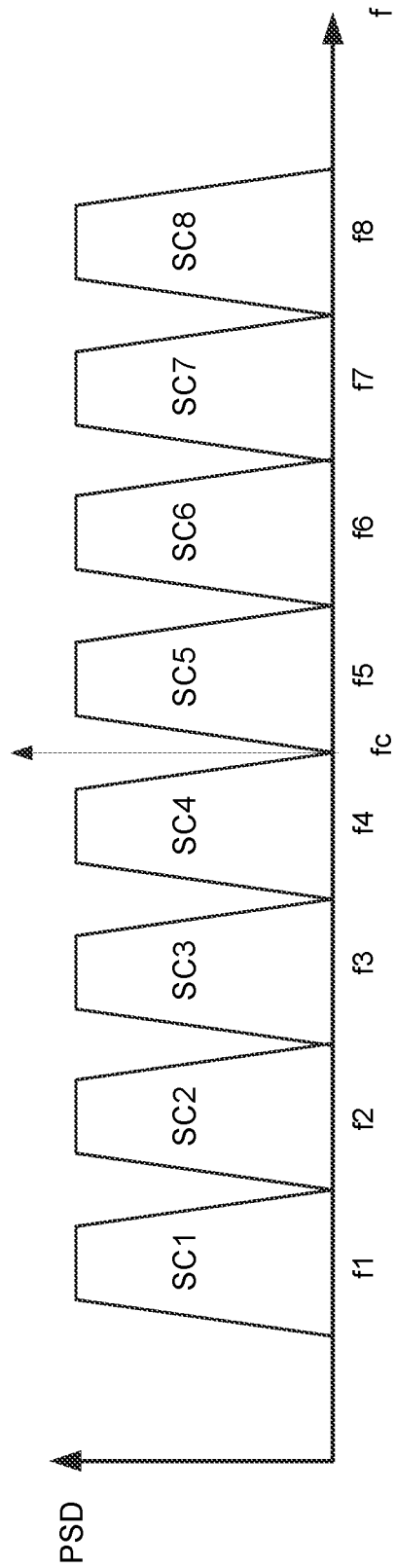
FIG. 3c is a power spectral density plot consistent with the present disclosure.

FIG. 3c illustrates an example of a power spectral density plot associated with optical subcarriers SC1 to SC8. As shown in FIG. 3c, each of optical subcarriers SC1 to SC8 has a respective one of optical frequencies f1 to f8. In addition, as noted above, laser 908 supplies light or an optical signal that is subject to modulation by modulators 311 (collectively such modulators may be referred to as a modulator). Such light or optical signal is a carrier and the frequency of such carrier is shown in FIG. 3c as carrier frequency fc. Typically, half of the subcarriers (e.g., SC1 to SC4) have frequencies that are less than fc and half of the subcarriers (e.g., subcarriers SC5 to SC8) have frequencies that are greater than fc.

Figure 3D:
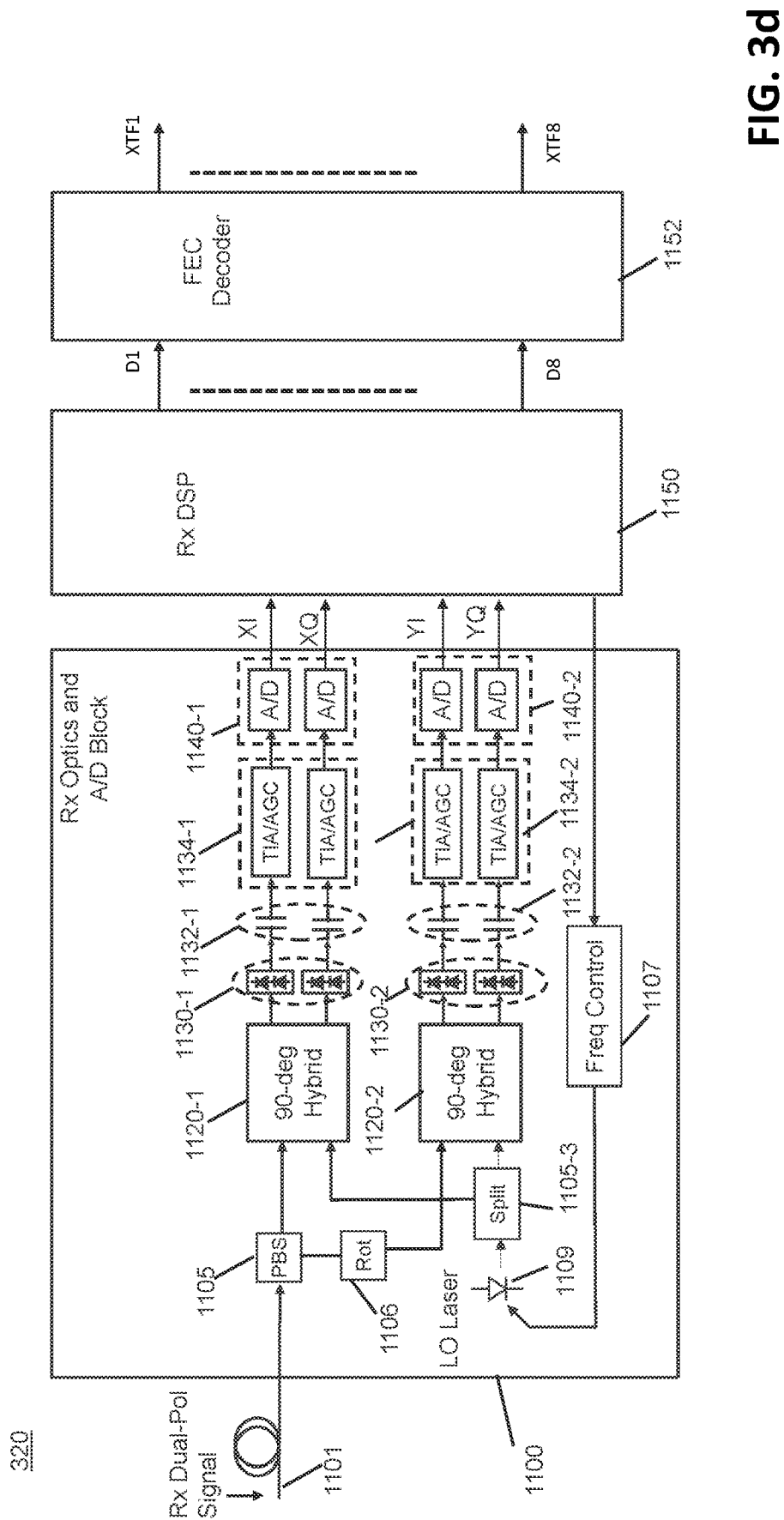
FIG. 3d is a diagram of a receiver consistent with the present disclosure.

An example of optical receiver 320 will next be described with reference to FIG. 3d. As shown in FIG. 3d, optical receiver 302 may include an Rx optics and A/D block 1100, which, in conjunction with DSP 1150, may carry out coherent detection. Block 1100 may include a polarization splitter (PBS) 1105 with first (1105-1) and second (1105-2) outputs), a local oscillator (LO) laser 1110, 90 degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), AC coupling capacitors 1132-1 and 1132-2, transimpedance amplifiers/automatic gain control circuits TIA/AGC 1134-1 and 1134-2, ADCs 1140-1 and 1140-2 (referred to generally as ADCs 1140 and individually as ADC 1140).

Polarization beam splitter (PBS) 1105 may include a polarization splitter that receives an input polarization multiplexed optical signal including optical subcarriers SC0 to SC19 supplied by optical fiber link 1101, which may be, for example, an optical fiber segment as part of one of optical communication paths 113-$k$ to 113-$m$ noted above. PBS 1105 may split the incoming optical signal into the two X and Y orthogonal polarization components. The Y component may be supplied to a polarization rotator 1106 that rotates the polarization of the Y component to have the X polarization. Hybrid mixers 1120 may combine the X and rotated Y polarization components with light from local oscillator laser 1110, which, in one example, is a tunable laser. For example, hybrid mixer 1120-1 may combine a first polarization signal (e.g., the component of the incoming optical signal having a first or X (TE) polarization output from a first PBS port with light from local oscillator 1110, and hybrid mixer 1120-2 may combine the rotated polarization signal (e.g., the component of the incoming optical signal having a second or Y (TM) polarization output from a second PBS port) with the light from local oscillator 1109. In one example, polarization rotator 1190 may be provided at the PBS output to rotate Y component polarization to have the X polarization.

Detectors 1130 may detect mixing products output from the optical hybrids, to form corresponding voltage signals, which are subject to AC coupling by capacitors 1132-1 and 1132-1, as well as amplification and gain control by TIA/AGCs 1134-1 and 1134-2. The outputs of TIA/AGCs 1134-1 and 1134-2 and ADCs 1140 may convert the voltage signals to digital samples. For example, two detectors (e.g., photodiodes) 1130-1 may detect the X polarization signals to form the corresponding voltage signals, and a corresponding two ADCs 1140-1 may convert the voltage signals to digital samples for the first polarization signals after amplification, gain control and AC coupling. Similarly, two detectors 1130-2 may detect the rotated Y polarization signals to form the corresponding voltage signals, and a corresponding two ADCs 1140-2 may convert the voltage signals to digital samples for the second polarization signals after amplification, gain control and AC coupling. RX DSP 1150 may process the digital samples associated with the X and Y polarization components to output data associated with one or more subcarriers within a group of subcarriers SC0 to SC8.

While FIG. 3*d* shows optical receiver 320 as including a particular number and arrangement of components, in some implementations, optical receiver 320 may include additional components, fewer components, different components, or differently arranged components. The number of detectors 1130 and/or ADCs 1140 may be selected to implement an optical receiver 320 that is capable of receiving a polarization multiplexed signal. In some instances, one of the components illustrated in FIG. 3*d* may carry out a function described herein as being carry out by another one of the components illustrated in FIG. 3*d*.

In one example, a particular subcarrier or group of subcarriers at a secondary node 112 may be selected by tuning local oscillator 1110 to output light having a wavelength or frequency relatively close to the selected subcarrier wavelength(s) to thereby cause a beating between the local oscillator light and the selected subcarrier(s). Such beating will either not occur or will be significantly attenuated for the other non-selected subcarriers so that data carried by the selected subcarrier(s) is detected and processed by DSP 1150. In a further example, all of SC1 to SC8 may be selected, for example, if the local oscillator laser is tuned to be within a bandwidth associated with the components included in receiver 320. In addition, in a further example, tuning the local oscillator to the carrier frequency fc or close to the carrier frequency facilitates detection of each of subcarriers SC1 to SC8. Circuitry may also be provided in DSP 1150 to select data associated with a particular subcarrier for output to the client.

As further shown in FIG. 3*d*, DSP 1150 supplies encoded outputs D1 to D8, which are provided to a FEC decoder circuit 1152, which, in turn, decodes the received DSP output and provided corresponding decoded outputs, namely, XTF frames XTF1 to XTF8, in this example.

Returning to FIG. 3*a*, FM 330 may divide a stream of data (representing an XTP frame) into chunks of continuous bytes, called "timeslots," associated with particular channels (e.g., a channel may refer to a communication between a particular source and a particular destination). In one implementation, each timeslot may include the same quantity of bytes (e.g., each timeslot may contain an equal amount of bandwidth). In another implementation, each timeslot may not include the same quantity of bytes (e.g., at least one timeslot may contain a different amount of bandwidth). The stream of data received by FM 330 may, in one implementation, already be segmented into timeslots. In this situation, when dividing the stream of data into timeslots, FM 330 may identify the timeslots based on, for examples, identifiers in the stream or the data's temporal position within the stream.

FM 330 may divide the data in each timeslot into a number of equal-bandwidth blocks of data. In one implementation, the quantity of blocks may equal the quantity of switches available in switching planes 232. Assume, for example, that there are sixteen switches available in switching planes 232. In this case, FM 330 may divide the data in a timeslot into sixteen equal blocks. FM 330 may send each of the blocks to a different one of the switches. In one implementation, FM 330 may sequentially send each of the blocks in a round robin fashion. In another implementation, FM 330 may send out each of the blocks in another systematic fashion.

Virtualization controller 340 may include hardware, or a combination of hardware and software, that may operate upon the overhead data of client data. For example, FM 330, of the ingress node, may extract overhead data from the client data and send the client overhead data to virtualization controller 340. Virtualization controller 340, of the ingress node, may receive the client overhead data from FM 330 and create virtual overhead (VOH) data. In one implementation, virtualization controller 340, of the ingress node, may compress the client overhead data in order to reduce the level of transmission bandwidth needed to carry the client overhead data, and in order to minimize cost, the amount of circuitry required, and power dissipation. Virtualization controller 340, of the ingress node, may send the VOH data to FM 330 for inclusion in one or more XTP frames. FM 330, of the ingress node, may receive the VOH data from virtualization controller 340 and store the VOH data as overhead data in one or more XTP frames or in other layers, such as XTF or the FEC overhead.

FM 330, of an intermediate node, may extract the VOH data from one or more XTP frames and send the VOH data to virtualization controller 340. Virtualization controller 340, of the intermediate node, may receive the VOH data from FM 330 and manipulate the VOH data. In one implementation, virtualization controller 340, of the intermediate node, may process the VOH data in the same manner that it would process client overhead data if the client data was available to the intermediate node, such as performing OTN services (e.g., monitoring all or part of the path used to transport the client data, generating overhead (e.g., VOH) data, etc.). Virtualization controller 340, of the intermediate node, may send the VOH data to FM 330 for inclusion in one or more XTP frames. FM 330, of the intermediate node, may receive VOH data from virtualization controller 340 and store the VOH data as overhead data in one or more XTP frames. In an alternative implementation, virtualization controller 340 may generate VOH data for inclusion in one or more XTP frames, rather than receiving and processing VOH data from FM 330.

In one example, an intermediate node may be a node having a structure and function similar to nodes 110 and 112 but provided between nodes 110-1 and 112-1. It is understood that nodes 110, 110-1, 112, and 112-1 have a similar structure, and include the transmitter and receiver discussed above.

FM 330, of an egress node, may extract the VOH data from one or more XTP frames and send the VOH data to virtualization controller 340. Virtualization controller 340, of the egress node, may receive the VOH data from FM 330 and recover the client overhead data. In one implementation, virtualization controller 340, of the egress node, may decompress the VOH data to recover the client overhead data. Virtualization controller 340, of the egress node, may send the recovered client overhead data to FM 330 for inclusion in the overhead section of the client data. FM 330, of the egress node, may receive client overhead data from virtualization controller 340 and, in one implementation, may replace the original client overhead data of the client data with the client overhead data from virtualization controller 340.

Figure 4:
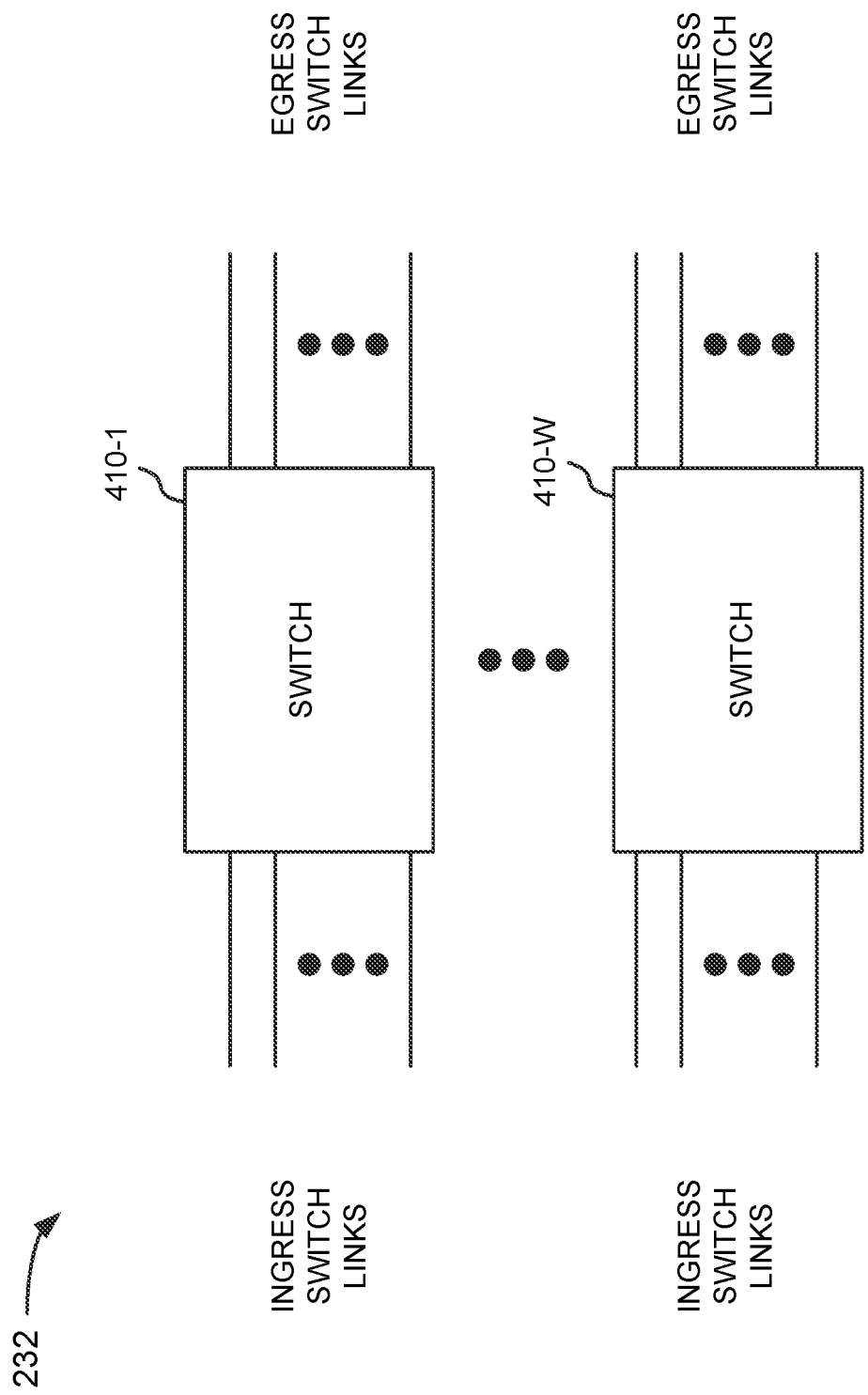
FIG. 4 is a diagram of exemplary components of a switching plane.

FIG. 4 is a diagram of exemplary components of a switching plane 232. As shown in FIG. 4, switching plane 232 may include switches 410-1, . . . , 410-W (referred to collectively as "switches 410," and generally as "switch 410") (where W≥1). While FIG. 4 shows a particular number and arrangement of components, switching plane 232 may include additional, fewer, different, or differently arranged components than those illustrated in FIG. 4. Also, it may be possible for one of the components of switching plane 232 to perform a function that is described as being performed by another one of the components.

Switch 410 may include hardware, or a combination of hardware and software, that may transfer a block of data received in a timeslot on an ingress switch link to a timeslot on an egress switch link, where the timeslot on the ingress switch link may differ from the timeslot on the egress switch link. Switch 410 may include a set of ingress switch links via which data is received, and a set of egress switch links via which data is transmitted. Each ingress switch link and egress switch link may connect to a particular FM 330. Switch 410 may be programmed with mapping information that instructs switch 410 on which egress switch link and in what timeslot to send a block of data received within a particular timeslot on a particular ingress switch link.

XTP and XTF Frame Formats

Figure 5:
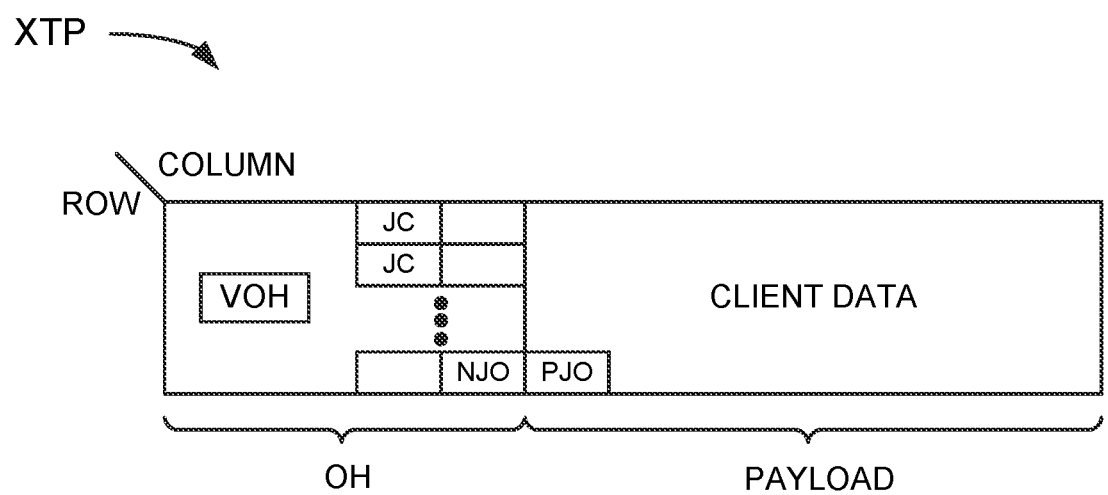
FIG. 5 is a diagram of an example of a switching transport path (XTP) frame.

FIG. 5 is a diagram of exemplary data of an XTP frame. As shown in FIG. 5, an XTP frame may include an overhead (OH) section and a payload section. In another implementation, the XTP frame may include additional or different sections than those shown in FIG. 5. For example, the XTP frame may include a forward error correction (FEC) section that may store data to aid in detecting and correcting errors.

The data of the XTP frame may be arranged as bytes of data in a number of rows and columns. When the XTP frame is transmitted, the data bytes in the first row may be transmitted, followed by the data bytes in the second row, and so forth. Thus, transmission of the XTP frame may include the transmission of overhead data followed by payload data (from the first row), the transmission of overhead data followed by payload data (from the second row), etc.

The overhead section may store data that aids in creation, transmission, performance management, fault management, and/or recovery of data of the XTF frame. In one implementation, the overhead section may store data similar to the data described in ITU-T Recommendation G.709. The payload section may store data from the client signal.

As shown in FIG. 5, the overhead section may store VOH data. In an alternative embodiment, the VOH data is provided in another layer, such as the XTF or FEC overhead. As explained above, VOH data may correspond to client overhead data from the client data. As described elsewhere, the client overhead data may be copied from the client data, processed, and stored as VOH data in the overhead section of the XTP frame. The VOH data may be stored at a particular location within the overhead section of the XTP frame to facilitate the identification of the VOH data within the XTP frame.

The XTP frame may use a combination of fixed and variable stuff locations to adapt the arbitrary client signal rate to the payload section of the XTP frame at a fixed rate, where the fixed rate of the XTP frame is independent of the rate of the client signal. In one implementation, the rate of the XTP frame is approximately 1.3324 Gbps. In another implementation, the rate of the XTP frame may be less or greater than 1.3324 Gbps.

The XTP frame may use a combination of justification control (JC) data and a negative justification opportunity (NJO) in the overhead section, and fixed and variable stuff areas in the payload section of the XTP frame to compensate for the arbitrary rate of the client signal. Fixed stuff locations are locations (that may be distributed throughout the payload) that do not carry any data in the payload section. The fixed stuff locations may vary for different client signal rates. The variable stuff location may refer to a location (shown as a positive justification opportunity (PJO) in FIG. 5) in the payload section that may or may not carry data in the XTP frame. A decision may be made, once per XTP frame, whether to store data in the variable stuff location or to "stuff" the variable stuff location (i.e., store null data).

Figure 6:
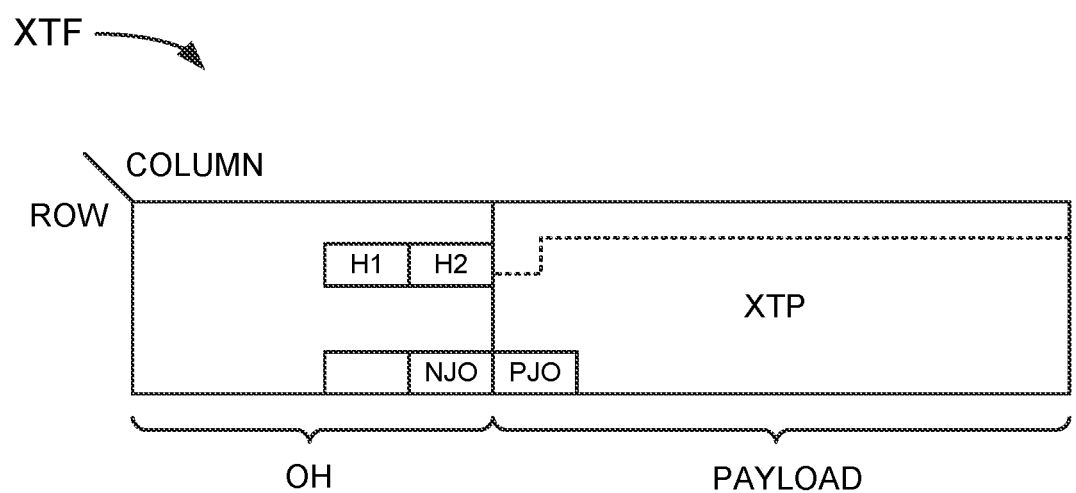
FIG. 6 is a diagram of exemplary data of a switching transport format (XTF) frame.

FIG. 6 is a diagram of exemplary data of an XTF frame. As shown in FIG. 6, an XTF frame may include an overhead (OH) section and a payload section. In another implementation, the XTF frame may include additional or different sections than those shown in FIG. 6. For example, the XTF frame may include a forward error correction (FEC) section that may store data to aid in detecting and correcting errors.

The data of the XTF frame may be arranged as bytes of data in a number of rows and columns. When the XTF frame is transmitted, the data bytes in the first row may be transmitted, followed by the data bytes in the second row, and so forth. Thus, transmission of the XTF frame may include the transmission of overhead data followed by payload data (from the first row), the transmission of overhead data followed by payload data (from the second row), etc.

The overhead section may store data that aids in creation, transmission, performance management, fault management, and/or recovery of data of the XTF frame. In one implementation, the overhead section may store data similar to the data described in ITU-T Recommendation G.709. The payload section may store data of an XTP frame. In one implementation, the payload section may store data from a single XTP frame. In another implementation, the payload section may store data from multiple XTP frames.

Since the rate of the XTP frame is fixed and the rate of the XTF frame is also fixed (though the rates are independent of each other and derived from independent clock sources), the XTF frame may use a variable stuff location, but need not use fixed stuff locations. For example, the XTF frame may use a pointer (e.g., offset), shown in FIG. 6 as H1 and H2 data, that identifies the location where the XTP data starts in the payload section. The pointer may permit the overhead section of the XTP to be easily located at, for example, intermediate nodes in the network, and may also permit the XTP frames to be deskewed at the egress node before the client data is extracted. The XTF frame may use a negative justification opportunity (NJO) and a positive justification opportunity (PJO) as a variable stuff location. The variable stuff location may refer to part of the payload section that may or may not carry data in the XTF frame. A decision may be made, once per XTF frame, whether to store data in the variable stuff location.

Exemplary Processes

In the description to follow, reference will be made to certain operations that may be performed to transmit client data of a client signal through an optical network from an ingress node (e.g., node 120-1 in FIG. 1) to an egress node (e.g., node 120-8 in FIG. 1) via an intermediate node (e.g., node 120-3 or node 120-4 in FIG. 1).

Figure 7A:
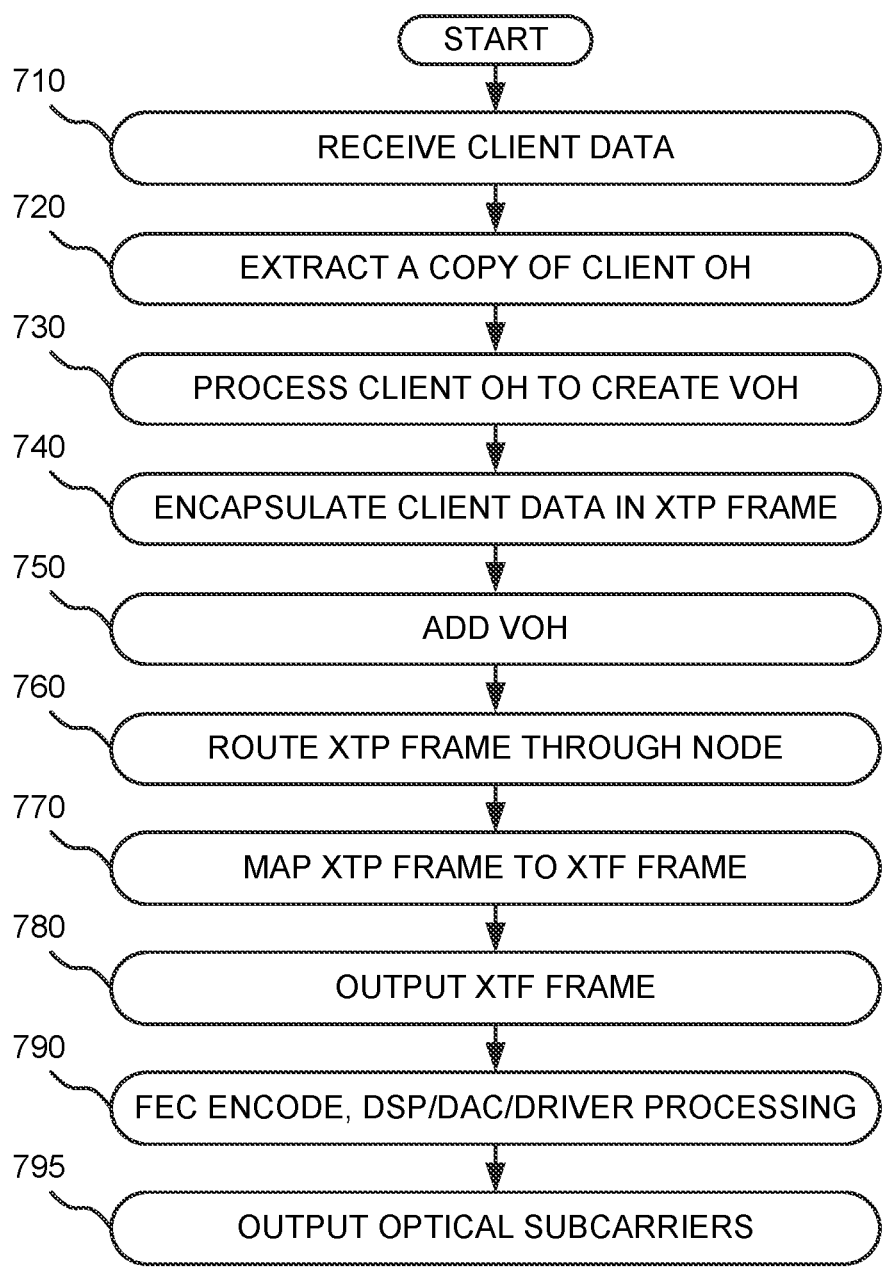
FIG. 7a is a flowchart of an exemplary process for performing dual asynchronous mapping of client data of a client signal at an ingress node.

FIG. 7a is a flowchart of an exemplary process 700 for performing dual asynchronous mapping of client data of a client signal at an ingress node. Process 700 may be performed by one or more components within the ingress node.

Process 700 may include receiving a client signal (block 710). For example, a FM 330 of a tributary module 220, of the ingress node, may receive an optical signal on an individual wavelength, and convert the signal to a stream of digital data, which may include client data of a client signal.

A copy of the overhead data from the client data may be extracted (block 720). For example, FM 330 may analyze the client data to identify the client overhead data. FM 330 may then make a copy of the client overhead data and send the client overhead data to virtualization controller 340.

The client overhead data may be processed to create VOH data (block 730). For example, virtualization controller 340 may receive the client overhead data and process the client overhead data in some manner to form the VOH data. In one implementation, virtualization controller 340 may compress the client overhead data to form the VOH data. In another implementation, virtualization controller 340 may simply use the client overhead data as the VOH data. In yet another implementation, virtualization controller 340 may process the client overhead data in some other manner, such as encoding the client overhead data.

The client data may be encapsulated in an XTP frame (block 740). For example, FM 330 may asynchronously map the client data into an XTP frame. A single XTP frame may include all or a portion of the client data. For a client signal with a rate over a particular threshold (e.g., greater than approximately 1.31 Gbps), FM 330 may asynchronously map the client data into multiple XTP frames (e.g., partition the client data into portions (where each portion may fit into the payload of an XTP frame) and map each of the portions into a separate XTP frame).

The VOH data may be added (block 750). In one example, the VOH data is added to the XTP overhead, but in other examples, the VOH data is added to another other layer, such as the XTF or FEC layer. Moreover, FM 330 may receive the VOH data from virtualization controller 340 and insert the VOH data at the appropriate location within the overhead section of the XTP frame.

Figure 8:
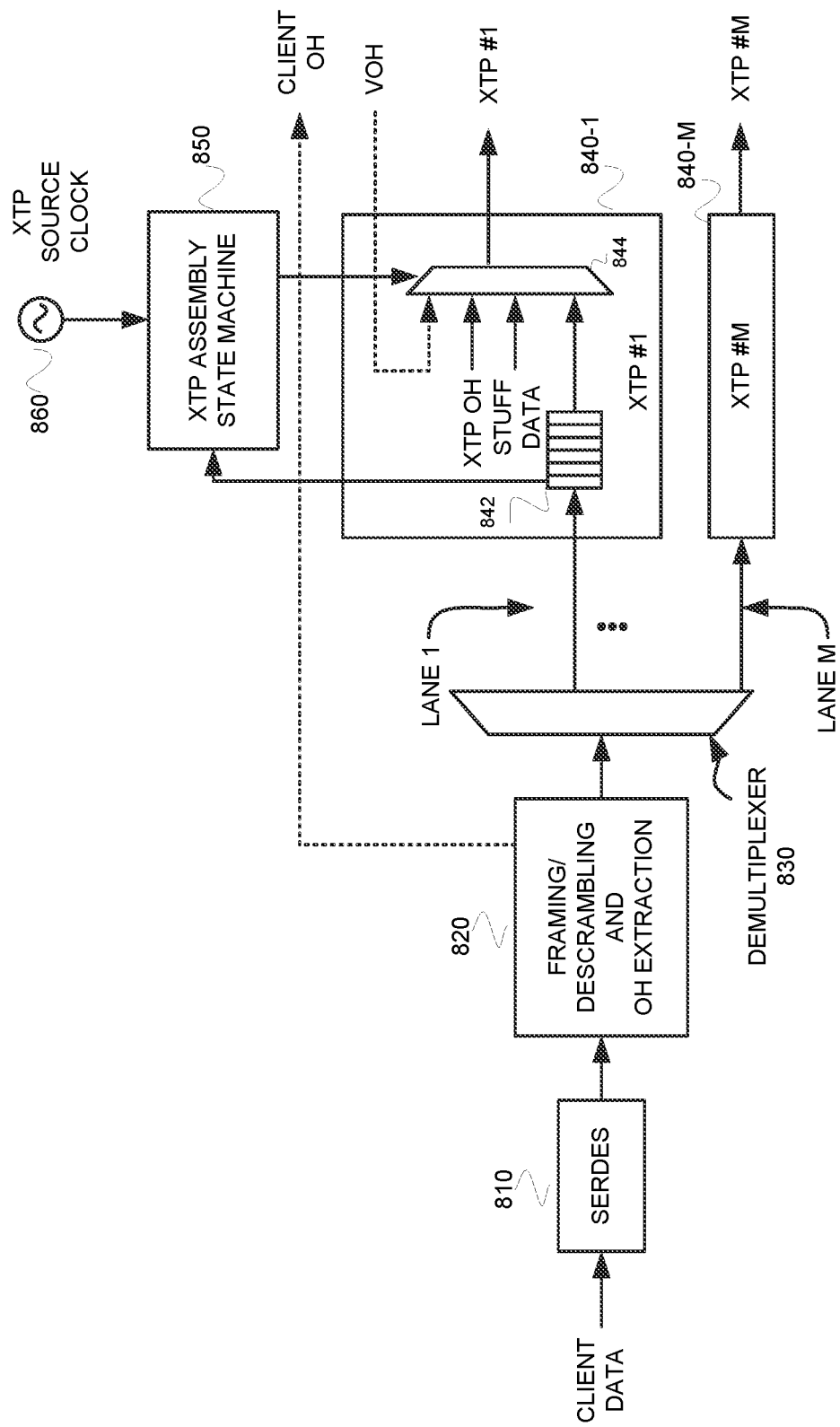
FIG. 8 is a diagram of exemplary functional components for extracting client overhead data from client data of a client signal, asynchronously mapping the client data into multiple XTP frames, and inserting virtual overhead (VOH) data into the overhead section of the XTP frames.

FIG. 8 is a diagram of exemplary functional components for extracting client overhead data from client data of a client signal, asynchronously mapping the client data into multiple XTP frames, and inserting VOH data into the overhead section of the XTP frames. In one implementation, tributary module 220 may include hardware, or a combination of hardware and software, to implement the functions of the components shown in FIG. 8. In another implementation, a device separate from, or in combination with, tributary module 220 may perform one or more of the functions described below. It is noted that the circuitry shown in FIG. 8, as well as that shown in FIGS. 9, 11, and 13 may be implemented on one chip or one multiple chips.

Tributary module 220 may include a serializer/deserializer (SerDes) 810, a framing/descrambling and overhead (OH) extraction component 820, a demultiplexer 830, XTP assembly components 840-1 through 840-M (where M≥1), an XTP assembly state machine 850, and an XTP source clock 860. XTP assembly component 840 may include a buffer 842 and a multiplexer 844. In another implementation, tributary module 220 may include additional, fewer, or different functional components to asynchronously map client data of a client signal into an XTP frame.

SerDes 810 may receive the client data and synchronously convert the client data to parallel format. In one implementation, SerDes 810 may operate from an externally applied reference that may be some sub-multiple of the bit rate of the client data. Framing/descrambling and OH extraction component 820 may perform framing and descrambling operations on the client data. For example, framing/descrambling component 820 may recover client frame sync (e.g., based on a framing word) and may descramble the overhead and payload of the client data. Framing/descrambling and OH extraction component 820 may also extract a copy of the overhead data from the client data and send the client overhead data to virtualization controller 340 (FIG. 3).

Demultiplexer 830 may receive the client data after the framing and descrambling. Demultiplexer 830 may decompose the client data into multiple parts using, for example, byte or word deinterleaving. It may be unnecessary, however, for the client data to be aligned to the data path on byte/word boundaries. Demultiplexer 830 may output the parts of the client data on M lanes. Each of the M lanes may be input to a different one of XTP assembly components 840.

The parts of the client data may be forwarded, via the M lanes, to buffers 842 of XTP assembly components 840. Buffers 842 may include elastic buffers, such as first-in, first-out (FIFO) memories, that serve to decouple the client signal rate from the rate of the XTP frames.

XTP assembly state machine 850 may asynchronously map each part of the client data to the payload area of an XTP frame. XTP assembly state machine 850 may assemble the individual XTP frames. The XTP rate may be driven by a free-running local oscillator (shown as XTP source clock 860 in FIG. 8). As described above, for a given nominal client signal rate (e.g., the nominal rate of each lane, after decomposition), certain defined locations in the XTP frame may always be null and may not contain data. As described above, these locations are called "fixed stuff" locations. The fixed stuff definition may be client rate-specific. Additionally, the XTP frame may contain positive and negative justification opportunities (PJOs/NJOs), which may or may not contain data for a given XTP frame. Finally, the XTP frame may include justification control indicators (JCs). The JCs may include flags that indicate whether or not the PJOs/NJOs do or do not contain data for a given XTP frame. To summarize, the fixed stuff locations may essentially define a fixed, client-specific nominal bandwidth and the PJOs/NJOs may dynamically adapt to the difference between the actual client rate and the fixed rate of the XTP frame.

XTP assembly state machine 850 may sequentially assemble each XTP frame by controlling the operation of multiplexer 844. For example, XTP assembly state machine 850 may cause multiplexer 844 to select data derived from buffer 842, fixed stuff data, XTP overhead data, the justification control indicators, and the VOH data. The VOH data may be received from virtualization controller 340 (FIG. 3a).

Fixed stuff locations are client rate-specific. During justification opportunities, XTP assembly state machine 850 may determine whether to insert data or stuff, based on the status of buffer 842, thereby keeping buffer 842 from overflowing or underflowing. XTP assembly state machine 850 may encode the associated justification control indicators to reflect the contents of the justification opportunities. XTP assembly state machine 850 may insert the VOH data at the appropriate location within the overhead section of an XTP frame. The output of XTP assembly components 840 may include XTP frames containing the client data.

Returning to FIG. 7a, the XTP frame may be routed through the ingress node (block 760). For example, FM 330 may segment the XTP frame into switch timeslots and distribute the XTP frame segments on ingress links associated with one or more of switch planes 232. Switches 410 (FIG. 4) may receive the XTP frame segments and identify egress links and timeslots on which to output the XTP frame segments based on the ingress links on which the XTP frame segments are received and the timeslots during which the XTP frame segments are received. Switches 410 may store mapping information that maps a combination of an input timeslot and an ingress link to an output timeslot and an egress link. Switches 410 may route the XTP frame segments accordingly. In one implementation, the XTP frame may be asynchronously mapped into one or more other frames while transporting the XTP frame through the ingress node.

The XTP frame may be asynchronously mapped to an XTF frame (block 770). As explained above, the XTF frame may be used to transport the XTP frame through the optical network in a manner such that the client data is opaque to intermediate nodes in the network.

Figure 9:
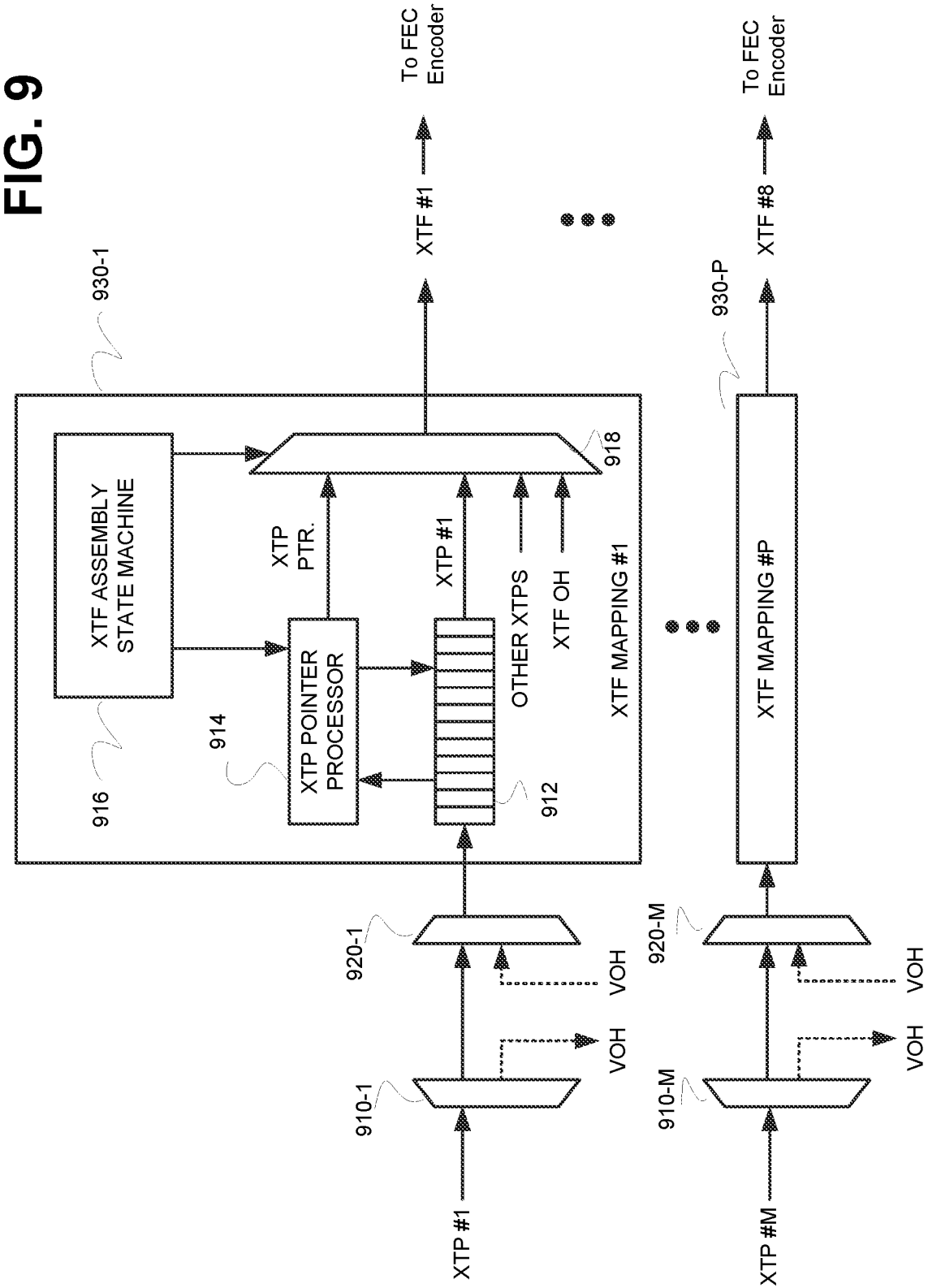
FIG. 9 is a diagram of exemplary functional components for asynchronously mapping an XTP frame into an XTF frame.

FIG. 9 is a diagram of exemplary functional components for asynchronously mapping an XTP frame into an XTF frame. In one implementation, an egress line module 210 may include hardware, or a combination of hardware and software, to implement the functions of the components shown in FIG. 9. In another implementation, a device separate from, or in combination with, egress line module 210 may perform one or more of the functions described below.

Egress line module 210 may include demultiplexers 910-1 through 910-M (collectively referred to as "demultiplexers 910," and generally as "demultiplexer 910"), multiplexers 920-1 through 920-M (collectively referred to as "multiplexers 920," and generally as "multiplexer 920"), and XTF mapping components 930-1 through 930-P (where P≤M) (collectively referred to as "XTF mapping components 930," and generally as "XTF mapping component 930"). Each XTF mapping component 930 may include a buffer 912, an XTP pointer processor 914, an XTF assembly state machine 916, and a multiplexer 918. In another implementation, egress line module 210 may include additional, fewer, or different functional components to asynchronously map an XTP frame to an XTF frame.

Demultiplexer 910 may receive data of an XTP frame and remove the VOH data from the overhead section of the XTP frame. Demultiplexer 910 may provide the VOH data to virtualization controller 340. Virtualization controller 340 may process the VOH data and provide the processed VOH data to multiplexer 920. Multiplexer 920 may receive the XTP frame from demultiplexer 910 and the VOH data from virtualization controller 340 and combine them by inserting the VOH data in the appropriate location in the overhead section of the XTP frame. Multiplexer 920 may provide data of the XTP frame to buffer 912 of XTF mapping component 930.

Buffer 912 may include an elastic buffer, such as a FIFO memory, that receives data of an XTP frame from multiplexer 920. Buffer 912 may serve to decouple the rate of the XTP frame from the rate of the XTF frame. XTP pointer processor 914 may monitor the XTP pointer to identify the start of the XTP frame within buffer 912. XTP pointer processor 914 may recover the XTP overhead data, for monitoring purposes, once the start of the XTP frame is identified. XTP pointer processor 914 may dynamically adapt for the difference in the rate of the XTP frame and the rate of the XTF frame using a variable stuff location. As described above, the location at which the XTP starts within the payload of the XTF frame may be identified in the overhead section of the XTF frame.

XTF assembly state machine 916 may asynchronously map the XTP frame to the payload area of an XTF frame. In one implementation, the XTF frame includes multiple XTP frames. In another implementation, the XTF frame may include a single XTP frame or a portion of an XTP frame. XTF assembly state machine 916 may operate based on an external clock associated with the optical link transmitter.

XTF assembly state machine 916 may sequentially assemble each XTF frame by controlling the operation of multiplexer 918. For example, XTF assembly state machine 916 may cause multiplexer 918 to select XTP frame data derived from buffer 912, the XTP pointer, XTF overhead data, and/or data associated with one or more other XTP frames (which may be output from other buffers 912 (not shown in FIG. 9)). The output of XTF mapping components 930 may include XTF frames containing XTP frames.

As shown in FIG. 9, each XTF mapping component 930 may include a separate XTF assembly state machine 916. In an alternative implementation, a single XTF assembly state machine 916 may be used for multiple XTF mapping components 930.

Returning to FIG. 7a, the XTF frame may be output (block 780). For example, transmitter 310 in egress line module 210 may transmit the XTF frame to FEC encoder 923 followed by further processing as described above in connection with FIG. 7a (step 790), to thereby apply drive signals to modulators 311. Modulators 311, in turn, modulate light output from laser 308 to provide, to an optical link, a plurality of optical subcarriers, each of which being associated with a respective one of the XTF frames (step 795). The XTF frames, as noted above, may transit one or more intermediate nodes 120 in the optical network over corresponding optical subcarriers.

Figure 7B:
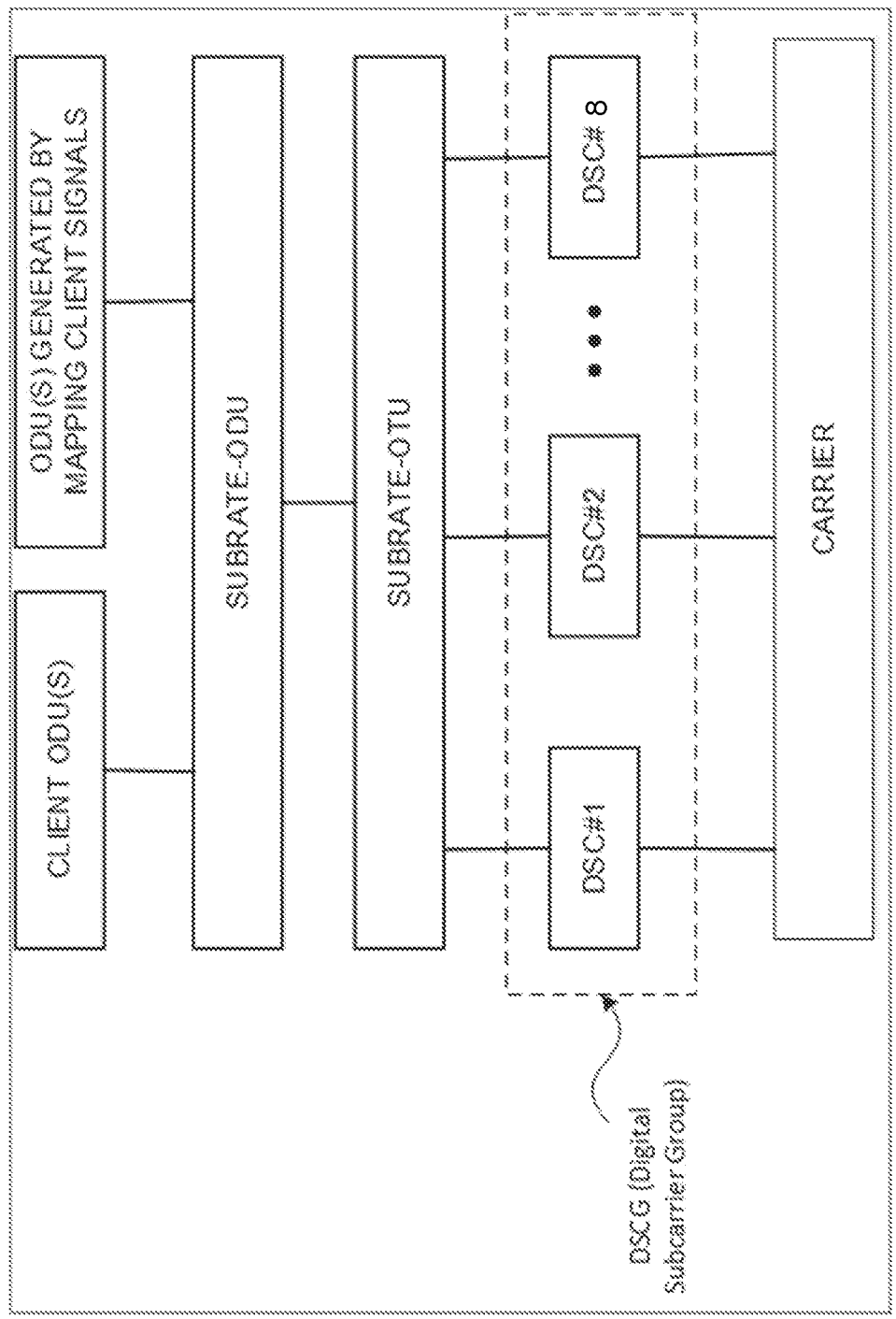
FIGS. 7b-7d are hierarchical diagrams of layers consistent with the present disclosure.

FIG. 7b is a hierarchical diagram showing an example of a signal hierarchy consistent with the present disclosure. As indicated in FIG. 7b, ODUs input from a client device may be mapped to an XTP frame. Alternatively, ODUs may be generated or derived from the client signal or data and such derived or generated ODUs may be mapped to an XTP frame. In either case, the XTP frames are converted to a subrate OTU. Each portion of the subrate OTU, e.g., the XTF frames, is then associated with a respective digital subcarrier (for example, DSC #1 to DSC #8), as well as a corresponding optical subcarrier SC1 to SC8, which are associated with a carrier.

FIG. 7b illustrates the realization of a sub-rate OTU signal which is supported by multiple (8 in this illustration) subcarriers. The OTUk signal has a capacity of (approximately) eight times the (digital) capacity of each subcarrier. In one example, all the entities shown in this illustration are confined to a single line module (or "FRU") so that the overhead information may be accessed in a device, such as a field programmable gate array (FPGA) located on the same FRU or an application specific integrated circuit located on the same FRU.

In a further example, FIG. 7b illustrates the view on a single node.

Figure 7C:
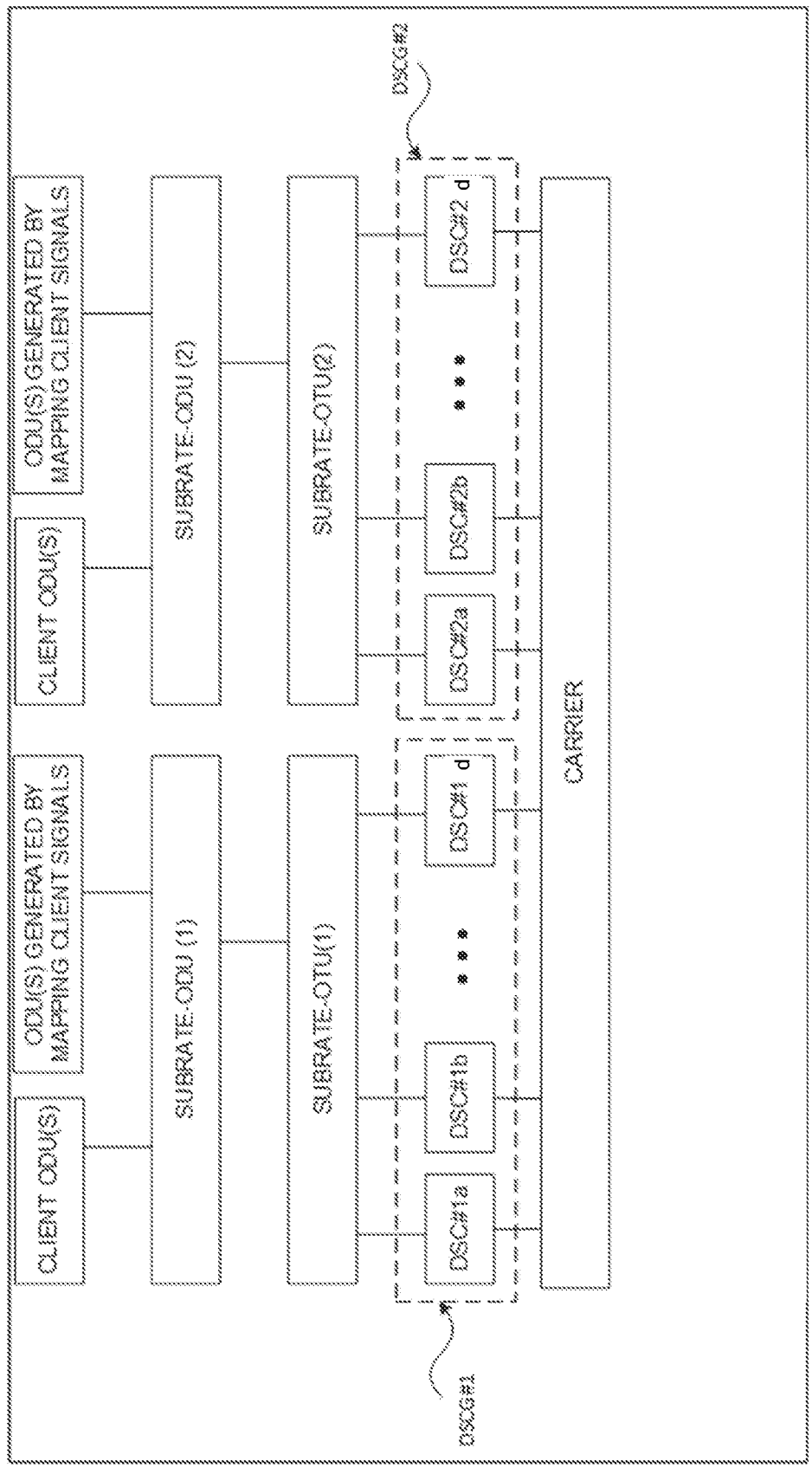

FIG. 7c shows an alternative hierarchical diagram whereby client ODUs, and ODUs generated by mapping client signals are converted to or associated with first and second subrate ODUs, Subrate ODU (1) and Subrate ODU (2), respectively. Subrate ODU (1) and subrate ODU (2) are converted to subrate OTU (1) and subrate OTU (2), respectively, portions of which are associated with or assigned to corresponding digital subcarrier groups DSCG #1 and DSCG #2, respectively. Here, DSCG #1 includes digital subcarriers DSC #1a to DSC #1d, corresponding to optical subcarriers OSC1 to OSC4, and DSCG #2 includes digital subcarriers DSC #2a to DSC #2d, corresponding to optical subcarriers OSC5 to OSC8, which, as noted above are associated with a carrier. It is noted that not all digital subcarriers need to be utilized for realizing the subrate OTU signals. Also, multiple sub-rate OTU signals may be realized out of the DSC(s) contained within a single carrier (see FIG. 7c). Not all digital subcarriers (eight in this example) within a carrier need to be utilized for realizing these sub-rate OTU signals.

Figure 7D:
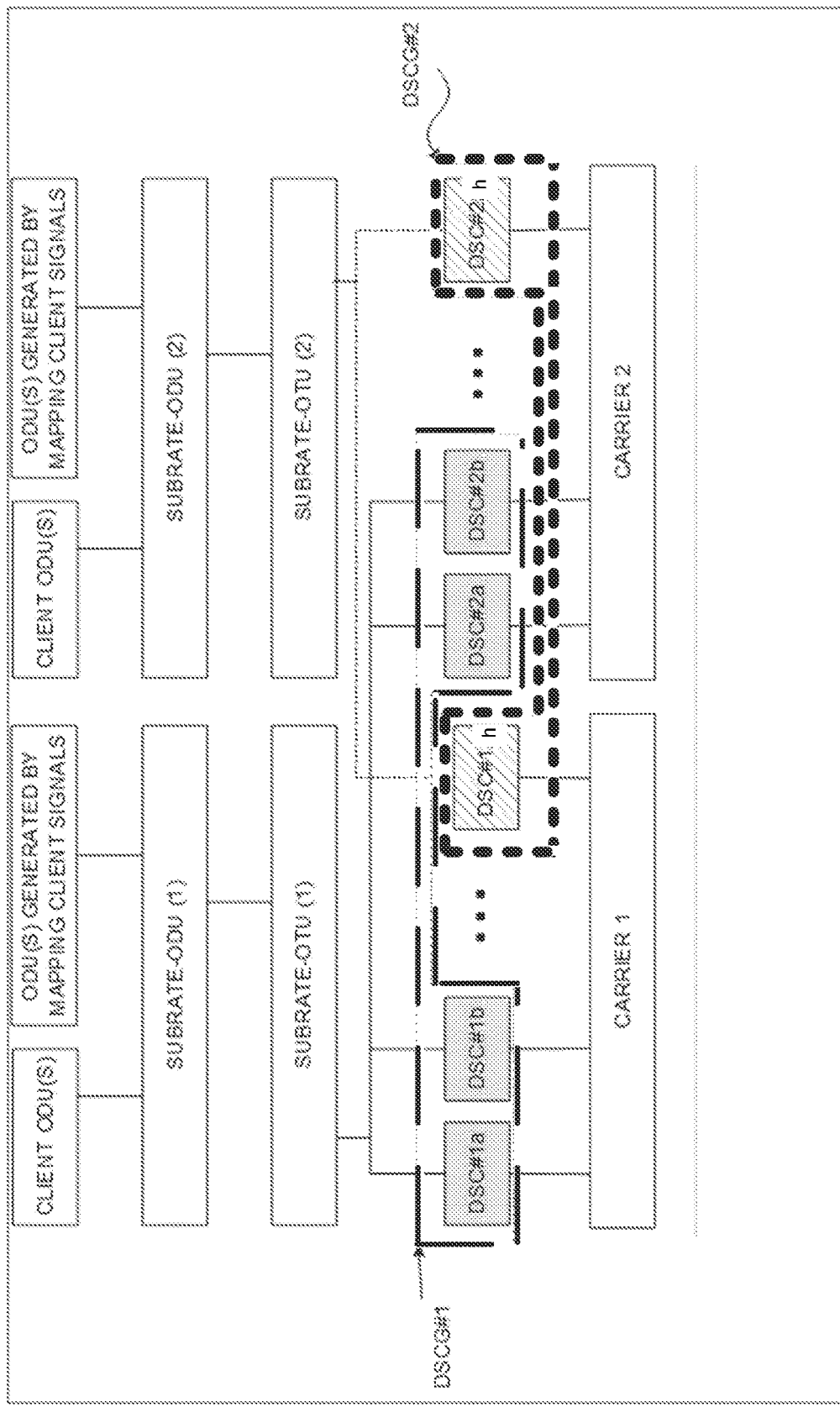

FIG. 7d shows a more general case of the configuration shown in FIG. 7c. Namely, FIG. 7d is a hierarchical diagram showing subrate-ODU (1) and subrate-ODU (2), as well as subrate OTU (1) and subrate OTU (2). Here, two carriers, carrier 1 and carrier 2, are provided, and each is associated with eight digital subcarriers DSC #1a to h and DSC #2a to h. Consistent with the present disclosure, not all digital subcarriers carrying subrate OTU (1) information need to be associated with the same carrier (e.g., carrier 1) nor all digital subcarriers carrying subrate OTU (2) information need be associated with or assigned to the same carrier, e.g., carrier 2. Accordingly, in the example shown in FIG. 7d, subrate OTU (1) information is carried by digital subcarriers DSC #1a, 1b, 2a, and 2b (as associated subcarriers of carriers 1 and 2) constituting digital subcarrier group DSCG #1, and subrate OTU (2) information is carried by digital subcarriers DSC #1h and 2h. In this example, two transmitters are provided, each having a laser and modulator, such that two carriers are generated, one from each laser, and each transmitter supplies a group of eight optical subcarriers.

It is noted that the number of subcarriers disclosed herein is exemplary only. More or fewer subcarriers may be provided. In particular, if multiple carriers are provided, each need not have the same number of subcarriers, or that the same number of subcarriers from the both carriers be used when forming the sub-rate OTU.

Based on the hierarchical drawings discussed above, some subrate OTUs are formed out of DSCs contained within a single carrier. In addition, all DSCs from all carriers are utilized to a realize a single subrate OTU, and, in one example, a 1:1 relation may be provided between the DSCs and the subrate OTUs supported by them (i.e. a subrate OTU is supported by exactly one DSC).

Figure 10A:
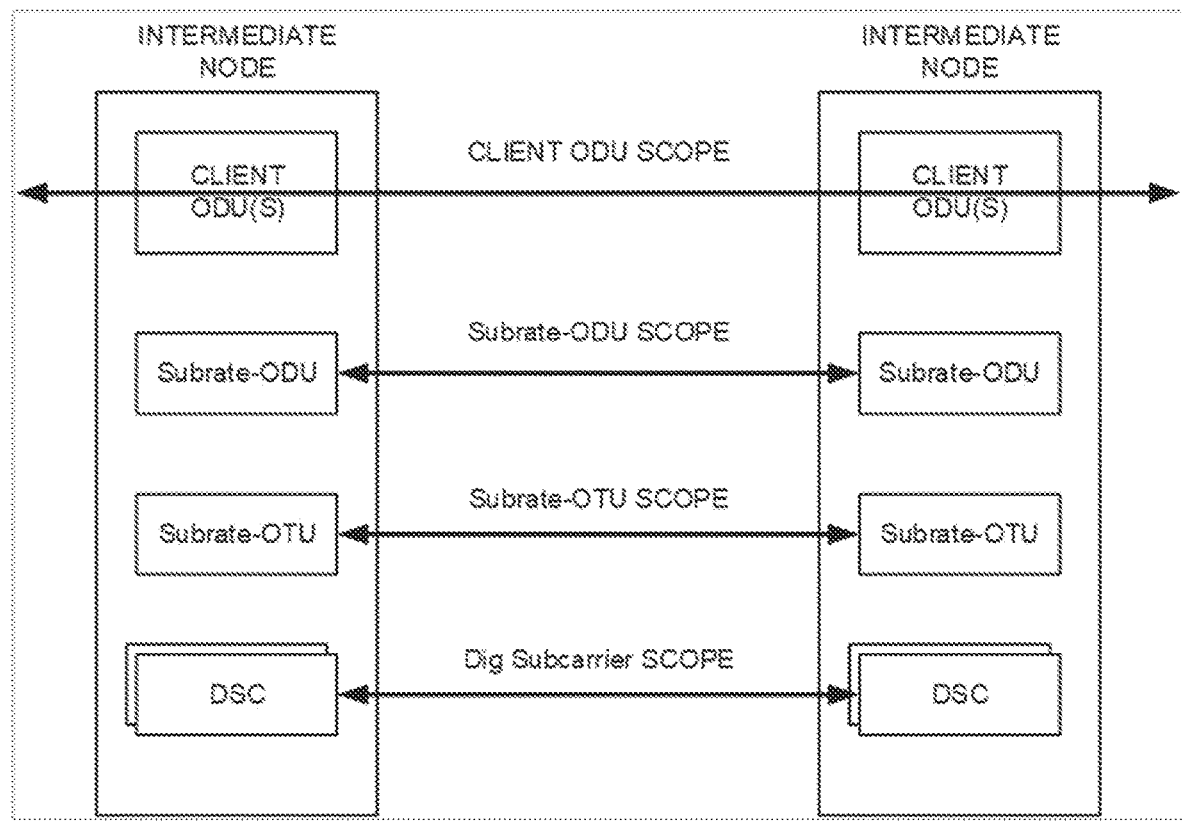
FIG. 10a is a diagram shows stacking of layers occurring at an intermediate node consistent with the present disclosure.

FIG. 10a is a hierarchical view of the layers (e.g., client ODUs, subrate-ODU, subrate-OTU, and DSCs) that exist, in one example, on two neighboring nodes, e.g., intermediate nodes shown in the figure. The term "scope" defines the extent of the layer in the network, and is defined by the termination points at which the layers (and associated overhead) are originated and terminated in the network.

Figure 10B:
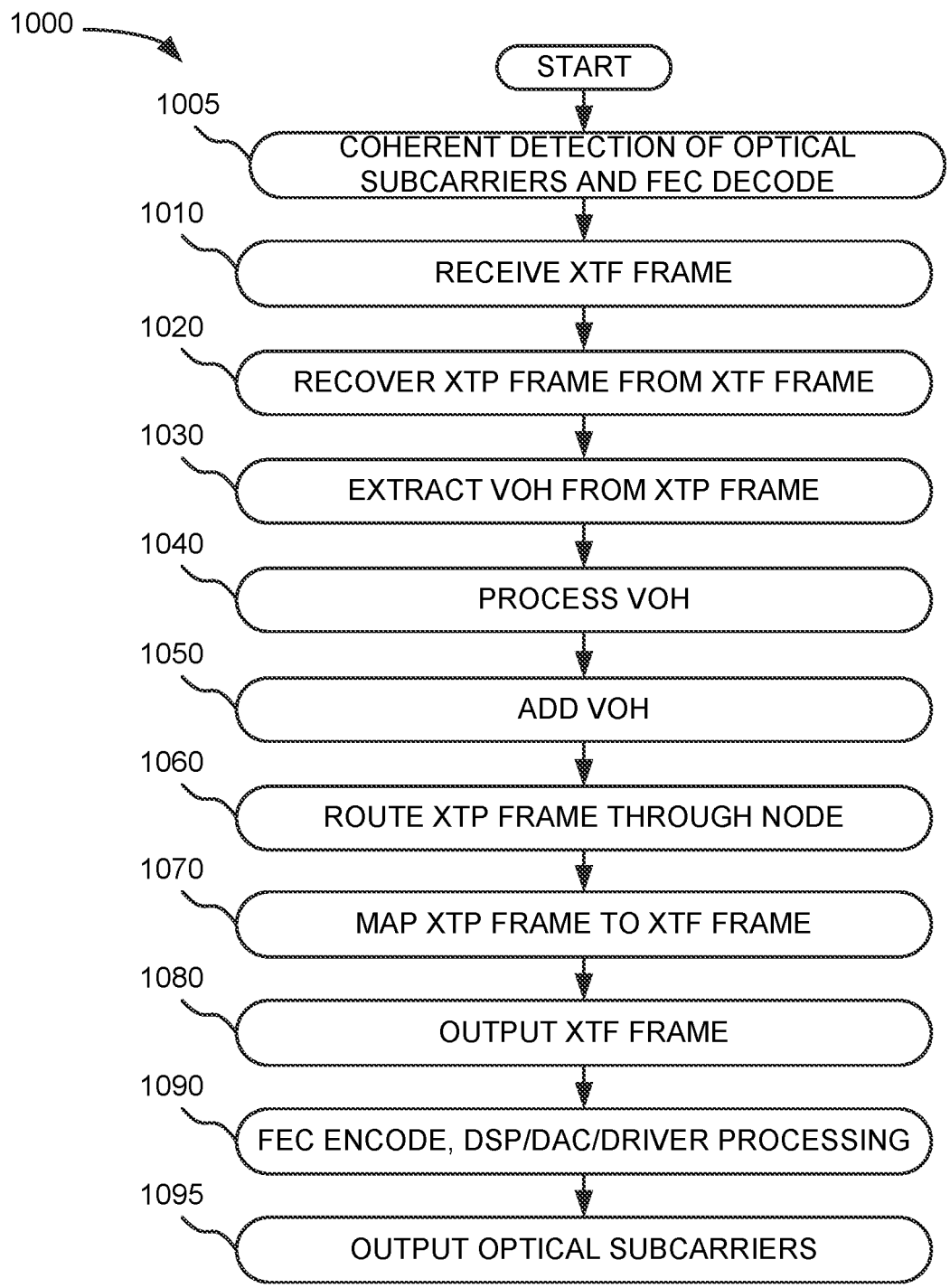
FIG. 10b is a flowchart of an exemplary process for performing asynchronous mapping of an XTP frame at an intermediate node.

FIG. 10b is a flowchart of an exemplary process 1000 for performing asynchronous mapping of an XTP frame at an intermediate node. Process 1000 may be performed by one or more components within the intermediate node.

Process 1000 may begin with coherent detection (step 1005) of one or more optical subcarriers by receiver 320 (described above), which supplies an received XTF frame (block 1010). For example, an ingress line module 210, of the intermediate node, may receive a multi-wavelength optical signal, separate the multi-wavelength signal into signals of individual wavelengths, and convert the signals to a stream of digital data, which may represent an XTF frame. A FM 330, within ingress line module 210, may receive the stream of data representing the XTF frame.

An XTP frame may be recovered from the XTF frame (block 1020). For example, ingress line module 210 may recover one or more XTP frames from a received XTF frame. In one implementation, as described above, a single XTF frame may include multiple XTP frames. In another implementation, a single XTF frame may include all or a portion of a single XTP frame.

Figure 11:
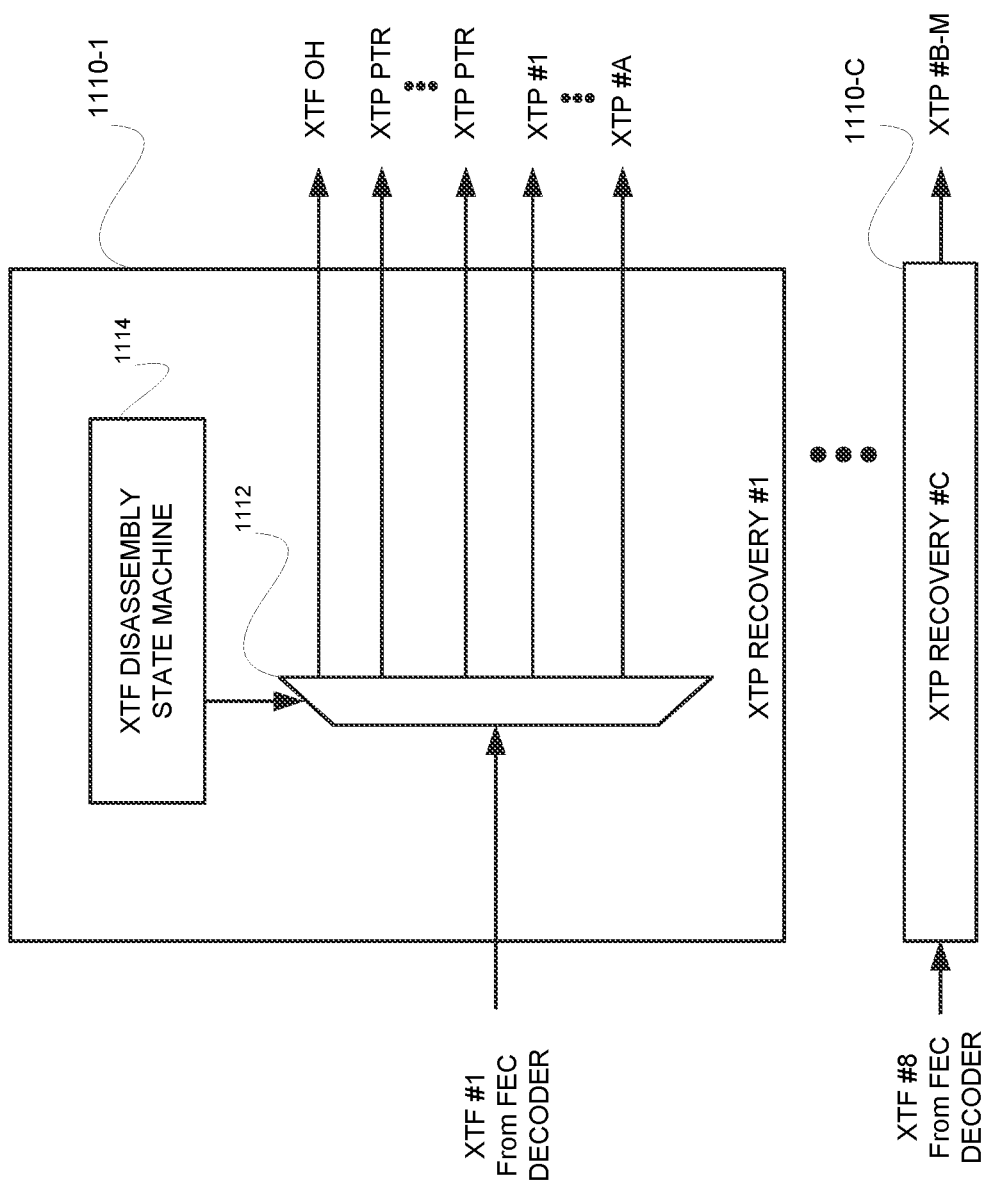
FIG. 11 is a diagram of exemplary functional components for recovering an XTP frame from an XTF frame.

FIG. 11 is a diagram of exemplary functional components for recovering multiple XTP frames from an XTF frame. In one implementation, ingress line module 210 may include hardware, or a combination of hardware and software, to implement the functions of the components shown in FIG. 11. In another implementation, a device separate from, or in combination with, ingress line module 210 may perform one or more of the functions described below.

Ingress line module 210 may include XTP recovery components 1110-1 through 1110-C (referred to collectively as "XTP recovery components 1110," and generally as "XTP recovery component 1110") (where C>1). Each XTP recovery component 1110 may include a demultiplexer 1112 and an XTF disassembly state machine 1114. In another implementation, ingress line module 210 may include additional, fewer, or different functional components to recover an XTP frame from an XTF frame. For example, in another implementation, each XTP recovery component 1110 may include additional components, such as a framing component, a buffer, and/or an XTP pointer processor to aid in the recovery of the XTP frame. In this situation, the framing component may recover an XTP frame sync (e.g., based on an XTP framing word), the buffer may store the data of an XTP frame and serve to decouple the rate of the XTF frame from the rate of an XTP frame, and the XTP pointer processor may monitor the data in the buffer to identify the start of the XTP frame and recover the XTP overhead data.

Demultiplexer 1112 may receive the XTF frame. The operation of demultiplexer 1112 may be controlled by XTF disassembly state machine 1114. XTF disassembly state machine 1114 may recover the XTP frame from the XTF frame. As explained above, in one implementation, the XTF frame includes multiple XTP frames. In another implementation, the XTF frame may include a single XTP frame or a portion of an XTP frame. XTF disassembly state machine 1114 may operate based on an external clock associated with the optical receiver.

XTF disassembly state machine 1114 may recover a group of XTP frames (shown as XTP frames 1-A) by controlling the operation of demultiplexer 1112. For example, XTF disassembly state machine 1114 may cause demultiplexer 1112 to extract the XTP frames and the XTF overhead data including the XTP pointers. Each of the XTP pointers may identify a location at which a corresponding XTP frame begins within the payload of the XTF frame.

As shown in FIG. 11, each XTP recovery component 1110 may include a separate XTF disassembly state machine 1114. In an alternative implementation, a single XTF disassembly state machine 1114 may be used for multiple XTP recovery components 1110.

The VOH data may be processed (block 1040). For example, virtualization controller 340 may process the VOH data in the same manner that it would process client overhead data if the client data was available to the intermediate node, such as performing OTN services (e.g., monitoring all or part of the path used to transport the client data, generating overhead (e.g., VOH) data, etc.). Virtualization controller 340 may provide the processed VOH data to FM 330.

The VOH data may be added (block 1050). In one example, the VOH data is added to the XTP overhead, but in other examples, the VOH data is added to another other layer, such as the XTF and FEC layers. For example, FM 330 may receive the VOH data from virtualization controller 340 and insert the VOH data at the appropriate location within the overhead section of the XTP frame.

The XTP frame may be routed through the intermediate node (block 1060). For example, FM 330 may segment the XTP frame into switch timeslots and distribute the XTP frame segments on ingress links associated with one or more of switch planes 232. Switches 410 (FIG. 4) may receive the XTP frame segments and identify egress links and timeslots on which to output the XTP frame segments based on the ingress links on which the XTP frame segments are received and the timeslots during which the XTP frame segments are received. Switches 410 may store mapping information that maps a combination of an input timeslot and an ingress link to an output timeslot and an egress link. Switches 410 may route the XTP frame segments accordingly. In one implementation, the XTP frame may be asynchronously mapped into one or more other frames while transporting the XTP frame through the intermediate node.

The XTP frame may be asynchronously mapped to an XTF frame (block 1070). As explained above, the XTF frame may be used to transport the XTP frame through the optical network in a manner such that the client data is opaque to intermediate nodes in the network. In one implementation, egress line module 210 may perform functions, similar to the functions described above with regard to FIG. 9, to asynchronously map the XTP frame to the XTF frame.

The XTF frame may be output (block 1080). For example, egress line module 210 may transmit the XTF to a FEC encoder similar to that described followed by further processing in steps 1090 and 1095 similar to steps 790 and 795, respectively (see above). In one implementation, egress line module 210 may convert the XTF frame to an optical signal, of a particular wavelength, and combine the optical signal with one or more other optical signals, of one or more other wavelengths, to create a multi-wavelength optical signal that may be transmitted on the optical link. The XTF frame may transit one or more additional intermediate nodes 120 in the optical network before reaching egress node 120.

While FIG. 10b shows the VOH data being extracted, processed, and added back into the XTP frame prior to routing the XTP frame through the intermediate node, this need not be the case. In another implementation, the VOH data may be extracted, processed, and added back into the XTP frame after routing the XTP frame through the intermediate node. In yet another implementation, the VOH data may be extracted, processed, and added back into the XTP frame both prior to and after routing the XTP frame through the intermediate node.

Figure 12:
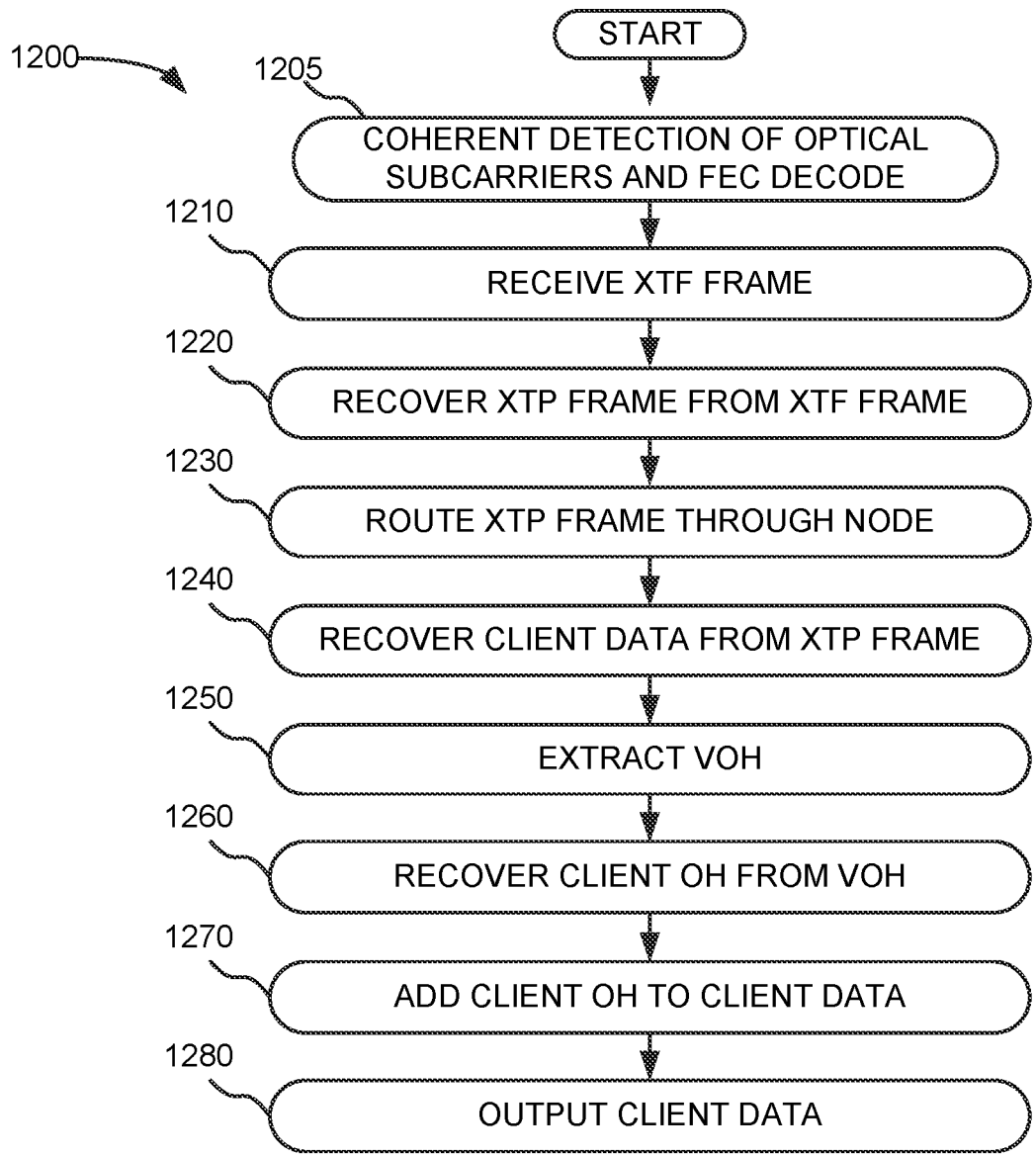
FIG. 12 is a flowchart of an exemplary process for recovering client data of a client signal at an egress node.

FIG. 12 is a flowchart of an exemplary process 1200 for recovering client data of a client signal at an egress node. Process 1200 may be performed by one or more components within the egress node.

Process 1200 may begin with coherent detection and FEC decoding (1205) similar to that described above, to thereby receive an XTF frame (block 1210). For example, an ingress line module 210, of the egress node, may receive a multi-wavelength optical signal, separate the multi-wavelength signal into signals of individual wavelengths, and convert the signals to a stream of digital data, which may represent an XTF frame. A FM 330, within ingress line module 210, may receive the stream of data representing the XTF frame.

An XTP frame may be recovered from the XTF frame (block 1220). For example, ingress line module 210 may recover one or more XTP frames from a received XTF frame. In one implementation, as described above, a single XTF frame may include multiple XTP frames. In another implementation, a single XTF frame may include all or a portion of a single XTP frame. In one implementation, ingress line module 210 may perform functions, similar to the functions described above with regard to FIG. 11, to recover the XTP frame from the XTF frame.

The XTP frame may be routed through the egress node (block 1230). For example, FM 330 may segment the XTP frame into switch timeslots and distribute the XTP frame segments on ingress links associated with one or more of switch planes 232. Switches 410 (FIG. 4) may receive the XTP frame segments and identify egress links and timeslots on which to output the XTP frame segments based on the ingress links on which the XTP frame segments are received and the timeslots during which the XTP frame segments are received. Switches 410 may store mapping information that maps a combination of an input timeslot and an ingress link to an output timeslot and an egress link. Switches 410 may route the XTP frame segments accordingly. In one implementation, the XTP frame may be asynchronously mapped into one or more other frames while transporting the XTP frame through the egress node.

The client data may be recovered from the XTP frame (block 1240). As explained above, the XTP frame may be used to transport all, or a portion, of the client data. When multiple XTP frames carry the client data, as the XTP frames traverse the optical network, the XTP frames may experience relative skew. Thus, it may be beneficial to deskew the XTP frames and reassemble them prior to extracting the client data.

The VOH data may be added (block 1250). In one example, the VOH data is added to the XTP overhead, but in other examples, the VOH data is added to another other layer, such as the XTF layer or FEC layer. For example, FM 330 may analyze the overhead section of the XTP frame to identify the VOH data. FM 330 may extract the VOH data and send the VOH data to virtualization controller 340.

The client overhead data may be recovered from the VOH data (block 1260). For example, virtualization controller 340 may decompress the VOH data to recover the client overhead data. Virtualization controller 340 may provide the recovered client overhead data to FM 330.

The client overhead data may be added to the client data (block 1270). For example, FM 330 may store the recovered client overhead data in the client overhead section of the client data, replacing any data that was originally stored there. In an alternative implementation, FM 330 may analyze and/or process the recovered client overhead data and discard it, leaving the data that was originally stored in the client overhead section.

Figure 13:
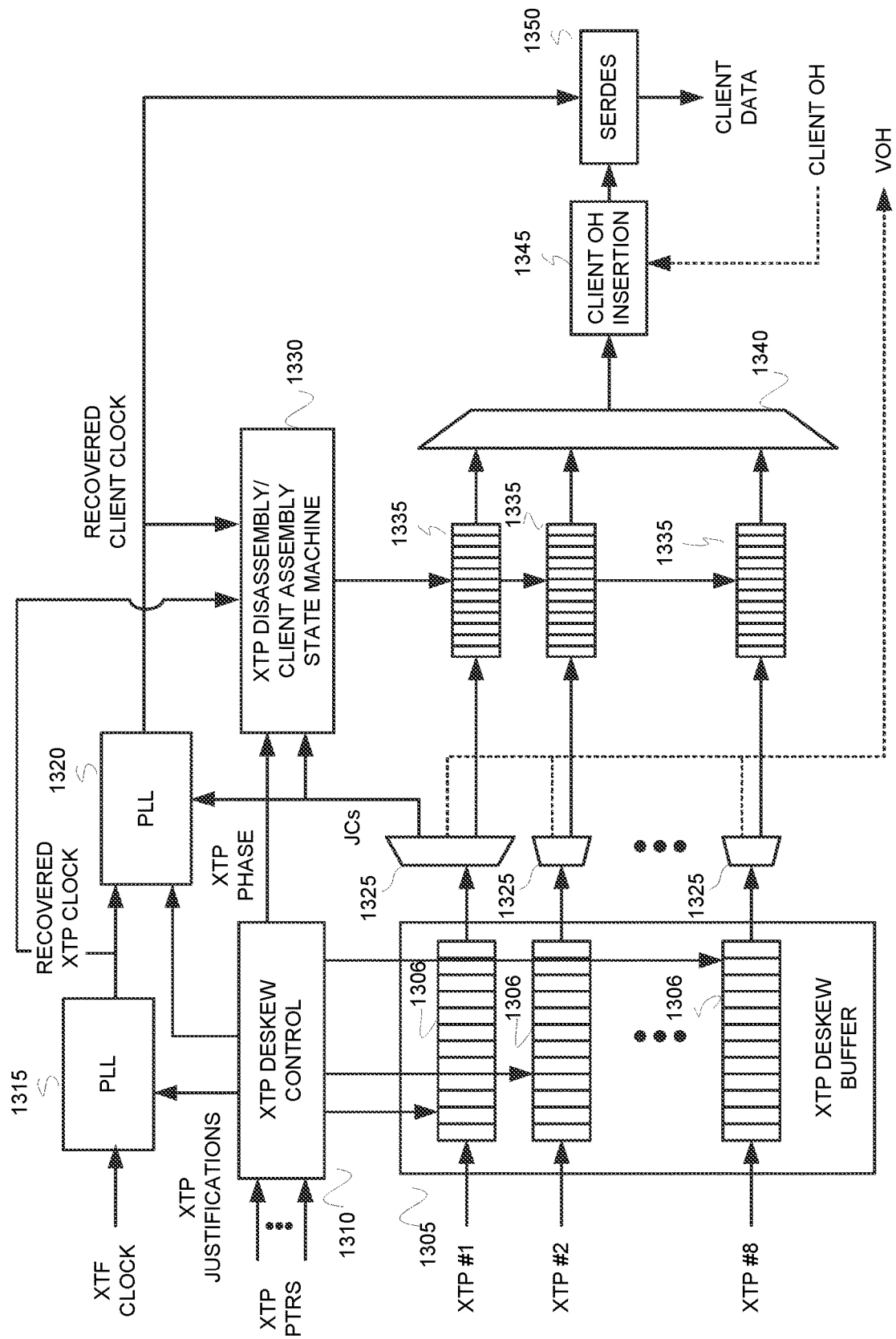
FIG. 13 is a diagram of exemplary functional components for recovering client data of a client signal from an XTP frame, recovering the client overhead data from the VOH data, and inserting the recovered client overhead data into the client data.

FIG. 13 is a diagram of exemplary functional components for recovering client data of a client signal from multiple XTP frames, recovering the client overhead data from the VOH data, and inserting the recovered client overhead data into the client data. In one implementation, tributary module 220 may include hardware, or a combination of hardware and software, to implement the functions of the components shown in FIG. 13. In another implementation, a device separate from, or in combination with, tributary module 220 may perform one or more of the functions described below.

Tributary module 220 may include an XTP deskew buffer 1305, XTP deskew control 1310, phase locked loop (PLL) 1315, PLL 1320, demultiplexers 1325, XTP disassembly/client assembly state machine 1330, buffers 1335, demultiplexer 1340, client overhead (OH) insertion 1345, and SerDes 1350. In another implementation, tributary module 220 may include additional, fewer, or different functional components to recover client data from an XTP frame.

In an exemplary operation, XTP deskew buffer 1305 may receive multiple XTP frames (e.g., the XTP frames containing the client data). XTP deskew buffer 1305 may include a number of buffers 1306. Buffer 1306 may include an elastic buffer, such as a FIFO memory, that stores an XTP frame.

XTP deskew control 1310 may receive XTP pointers corresponding to the XTP frames. XTP deskew control 1310 may control the storing and outputting of data associated with each of the XTP frames to deskew the XTP frames before the XTP frames are realigned. The implementations, described herein, may support routing of XTP frames over different fiber paths or even different physical paths (i.e., diverse routes) if sufficient deskew buffering is provided at egress node 120.

XTP deskew control 1310 may detect skew using the XTP pointers. The XTP pointer indicates the first byte/word in the XTP structure. Based on detection of the relative XTP phase, XTP deskew control 1310 can realign all of the XTP frames at the egress of XTP deskew buffer 1605.

After realignment, XTP overhead data, including justification control indicators (JCs) and the VOH data, may be extracted via demultiplexers 1325. The portion of the XTP frame containing actual client data may be recovered by extracting fixed stuff locations, and by processing the JCs. Fixed stuff locations may be predefined based on the client signal type/rate and, therefore, may be known once the XTP frame is delineated. JCs may indicate which of the positive/negative justification opportunities (PJOs/NJOs) in the XTP frame contain data and which are stuffed. Recall that in the client ingress mapping process, justifications of the client into the XTP frame may be done symmetrically on all XTP frames. By extension, all justifications may be processed symmetrically at the client ingress from the XTP frame. Therefore, only the JCs from one XTP need to be processed, and only one state machine (e.g., XTP disassembly/client assembly state machine 1330) may be needed for XTP decapsulation.

The VOH data may be sent to virtualization controller 340 (FIG. 3) for processing. For example, virtualization controller 340 may decompress the VOH data to recover the client overhead data, which may have been modified by one or more nodes 120 during transit of the client data within one or more XTP frames.

XTP disassembly/client assembly state machine 1330 may reconstruct the client data by interleaving the client portions, per-XTP, in sequence. XTP disassembly/client assembly state machine 1330 may control the operation of buffers 1335 and multiplexer 1340. Buffer 1335 may include an elastic buffer, such as a FIFO memory, that receives portions of the client data that have been extracted from the XTP frames. Buffers 1335 may output the client data portions to multiplexer 1340. XTP disassembly/client assembly state machine 1330 may control multiplexer 1340 to output the client data portions so as to interleave the client data portions and recover the client data.

XTP disassembly/client assembly state machine 1330 may operate based on a recovered XTP clock and/or a recovered client clock. Two PLLs 1315 and 1320 may be used to recover the client clock. PLL 1315 may receive, as input, the XTF clock signal and XTP justifications, and output the recovered XTP clock. PLL 1320 may receive the XTP clock signal and information regarding XTP justifications to recover the client clock signal. The client clock signal may be used by XTP disassembly/client assembly state machine 1330 to recover the client data. In another implementation, the client clock may be generated in another manner, such as from a free-running clock.

Once the client data is recovered, the client overhead data may be inserted by client overhead insertion component 1345. Client overhead insertion component 1345 may receive the recovered client overhead data from virtualization controller 340. In one implementation, client overhead insertion component 1345 may replace the original client overhead data in the client data with the recovered client overhead data. In another implementation, client overhead insertion component 1345 may discard the recovered client overhead data and retain the original client overhead data in the client data. In either implementation, client overhead insertion component 1345 may modify, if necessary, the original or recovered client overhead data prior to inserting the client overhead data into the client data. The client data may then be serialized for transmission by SerDes 1350.

Returning to FIG. 12, the client data may be output (block 1280). For example, tributary module 220 may convert the client data to an optical signal of a particular wavelength and output the client data to a client device 110. Alternatively, tributary module 220 may combine the wavelength containing the client data with wavelengths containing other client data to generate a multi-wavelength optical signal, and send the multi-wavelength optical signal to client device 110.

While FIG. 12 shows the VOH data being extracted and the client overhead data being recovered after routing the XTP frame through the egress node, this need not be the case. In another implementation, the VOH data may be extracted and the client overhead data may be recovered prior to routing the XTP frame through the egress node. In yet another implementation, operations relating to extracting the VOH data and recovering the client overhead data may be performed both prior to and after routing the XTP frame through the egress node.

EXAMPLE

Figure 14:
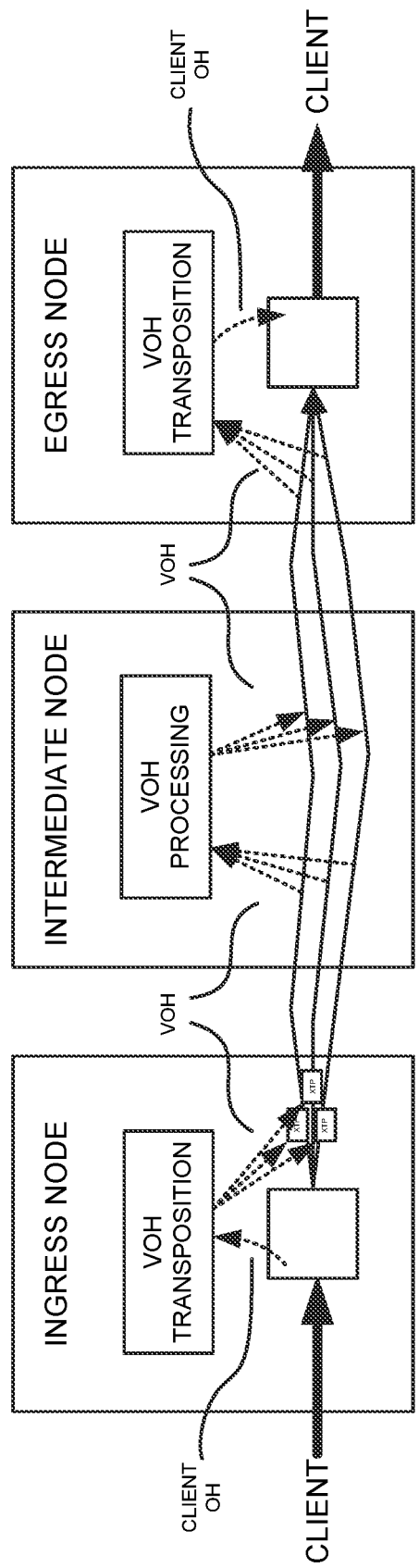
FIG. 14 is a diagram of an example of transporting client data of a client signal through an optical network.

FIG. 14 is a diagram of an example of transporting client data of a client signal through an optical network. FIG. 14 shows a simplified view of an optical network that includes three nodes: an ingress node, an intermediate node, and an egress node. Assume that the client signal is an OTN-compliant signal that is transmitted from the ingress node to the egress node.

The tributary module, of the ingress node, may receive client data of the client signal, where the client signal has an arbitrary rate. In one implementation, the tributary module may extract a copy of the client overhead data from the client data. The tributary module may asynchronously map the client data (including original client overhead data) into a collection of first frames, called XTP frames (e.g., see FIG. 5) (shown as three XTP frames in FIG. 14). The XTP frames have a particular, constant length, and a fixed rate (which is independent of the rate of the client signal). Each XTP frame may use a combination of variable and fixed stuff locations to compensate for the different rate of the client signal. The XTP frames are the vehicles for transporting the client data across the optical network in a manner such that the client data is opaque to the intermediate node.

The tributary module, of the ingress node, may process the client overhead data to create virtual overhead (VOH) data. The tributary module may insert the VOH data into the overhead section of one or more of the XTP frames. In other words, a single XTP frame may include the entire VOH data. Alternatively, the VOH data may be inserted into or distributed across two or more XTP frames in the collection of XTP frames.

The tributary module, of the ingress node, may output the XTP frames to an egress line module for transmission on the optical network. The egress line module may asynchronously map the XTP frames into one or more second frames, called XTF frame(s) (e.g., see FIG. 6), for transmission on the optical network. The XTF frame has a particular, constant length, and a fixed nominal rate (which is independent of the rate of the client signal and the rate of the XTP frame) that may differ slightly from XTF frame-to-XTF frame. Each XTF frame may use a variable stuff location to compensate for the different rate of the XTP frame. Each XTF frame may also use a pointer that identifies the start of the XTP frame within the payload of the XTF frame. The egress line module may transmit the XTF frame on an optical link to a next hop node (i.e., the intermediate node).

The ingress line module, of the intermediate node, may receive the XTF frame(s) and extract the XTP frames. The ingress line module may extract the VOH data from the XTP frames, process the VOH data, and insert the processed VOH data in the overhead section of the XTP frames. The ingress line module may output the XTP frames to an egress line module for transmission on the optical network.

The egress line module, of the intermediate node, may receive the XTP frames and asynchronously map the XTP frames into one or more XTF frames for transmission on the optical network. The intermediate node may not recover the client data and, thus, need not be aware of the client data being transported in the XTP frames. The intermediate node operates only upon the XTP frame—performing one level of mapping of the XTP frame out of and into an XTF frame. While the client data is not available to the intermediate node, the client overhead data is available via the VOH data. Thus, the intermediate node may process the client overhead data (via the VOH data), as necessary. The intermediate node may transmit the XTF frame on an optical link to a next hop node (i.e., the egress node).

The ingress line module, of the egress node, may receive the XTF frame and extract the XTP frame. The ingress line module may extract the VOH data from the XTP frames and process the VOH data to recover the client overhead data. The ingress line module may output the XTP frames to a tributary module for transmission to a client device.

The tributary module, of the egress node, may receive the XTP frames and use the pointers (that refer to the start of the XTP frame(s) within an XTF frame) to concatenate and realign the XTP frames associated with a same client signal (which, as described above, has been mapped into multiple XTP frames). The tributary module may then extract the client data from the XTP frames and insert the recovered client overhead data into the client data. The tributary module may transmit the client data to a client device.

Because the intermediate node can operate upon the client overhead data (via the VOH data) without having to recover the client data, the hardware and software logic at the intermediate nodes can be greatly simplified.

Figure 15:
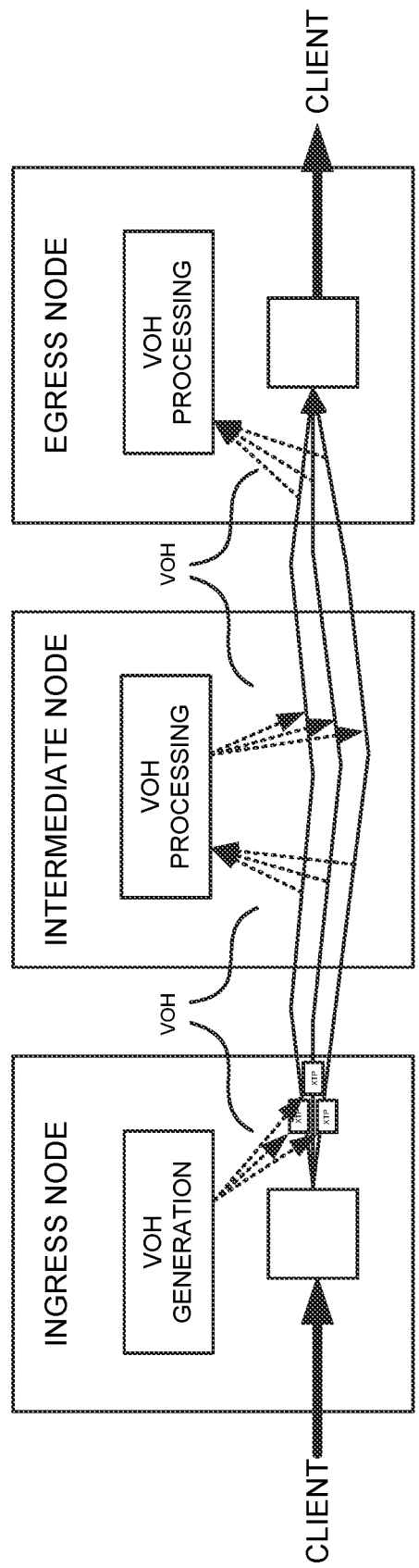
FIG. 15 is a diagram of another example of transporting client data of a client signal through an optical network.

FIG. 15 is a diagram of another example of transporting client data of a client signal through an optical network. FIG. 15 shows a simplified view of an optical network that includes three nodes: an ingress node, an intermediate node, and an egress node. In one implementation, assume that the client signal is a non-OTN-compliant signal (e.g., Ethernet or SONET/SDH) that is transmitted from the ingress node to the egress node. In another implementation, assume that the client signal is an OTN-compliant signal (e.g., a client ODU2 signal) for which it is desired to virtualize a higher level of multiplexing (e.g., emulate that the client ODU2 signal is carried over an ODU3 signal through the network).

The tributary module, of the ingress node, may receive client data of the client signal, where the client signal has an arbitrary rate. The tributary module may asynchronously map the client data (including original client overhead data) into a collection of first frames, called XTP frames (e.g., see FIG. 5) (shown as three XTP frames in FIG. 15). The XTP frames have a particular, constant length, and a fixed rate (which is independent of the rate of the client signal). Each XTP frame may use a combination of variable and fixed stuff locations to compensate for the different rate of the client signal. The XTP frames are the vehicles for transporting the client data across the optical network in a manner such that the client data is opaque to the intermediate node.

The tributary module, of the ingress node, may generate virtual overhead (VOH) data. In this case, the VOH data may be generated without extracting the original client overhead data. The generated VOH data may include information that may facilitate the transmission of the client data through the optical network. For example, in the one exemplary implementation described above, the VOH data may correspond to overhead data for the higher-level signal (e.g., ODU3 overhead). The tributary module may insert the VOH data into the overhead section of one or more of the XTP frames. In other words, a single XTP frame may include the entire VOH data. Alternatively, the VOH data may be inserted into or distributed across two or more XTP frames in the collection of XTP frames.

The tributary module, of the ingress node, may output the XTP frames to an egress line module for transmission on the optical network. The egress line module may asynchronously map the XTP frames into one or more second frames, called XTF frame(s) (e.g., see FIG. 6), for transmission on the optical network. The XTF frame has a particular, constant length, and a fixed nominal rate (which is independent of the rate of the client signal and the rate of the XTP frame) that may differ slightly from XTF frame-to-XTF frame. Each XTF frame may use a variable stuff location to compensate for the different rate of the XTP frame. Each XTF frame may also use a pointer that identifies the start of the XTP frame within the payload of the XTF frame. The egress line module may transmit the XTF frame on an optical link to a next hop node (i.e., the intermediate node).

The ingress line module, of the intermediate node, may receive the XTF frame(s) and extract the XTP frames. The ingress line module may extract the VOH data from the XTP frames, process the VOH data, and insert the processed VOH data in the overhead section of the XTP frames. The ingress line module may output the XTP frames to an egress line module for transmission on the optical network.

The egress line module, of the intermediate node, may receive the XTP frames and asynchronously map the XTP frames into one or more XTF frames for transmission on the optical network. The intermediate node may not recover the client data and, thus, need not be aware of the client data being transported in the XTP frames. The intermediate node may operate only upon the XTP frame—performing one level of mapping of the XTP frame out of and into an XTF frame. The intermediate node may transmit the XTF frame on an optical link to a next hop node (i.e., the egress node). Because the intermediate node can operate upon the VOH data without having to recover the client data, the hardware and software logic at the intermediate nodes can be greatly simplified.

The ingress line module, of the egress node, may receive the XTF frame and extract the XTP frame. The ingress line module may extract the VOH data from the XTP frames, process the VOH data, as necessary, and discard the VOH data. The ingress line module may output the XTP frames to a tributary module for transmission to a client device.

The tributary module, of the egress node, may receive the XTP frames and use the pointers (that refer to the start of the XTP frame(s) within an XTF frame) to concatenate and realign the XTP frames associated with a same client signal (which, as described above, has been mapped into multiple XTP frames). The tributary module may then extract the client data from the XTP frames. The tributary module may transmit the client data to a client device.

Figure 16:
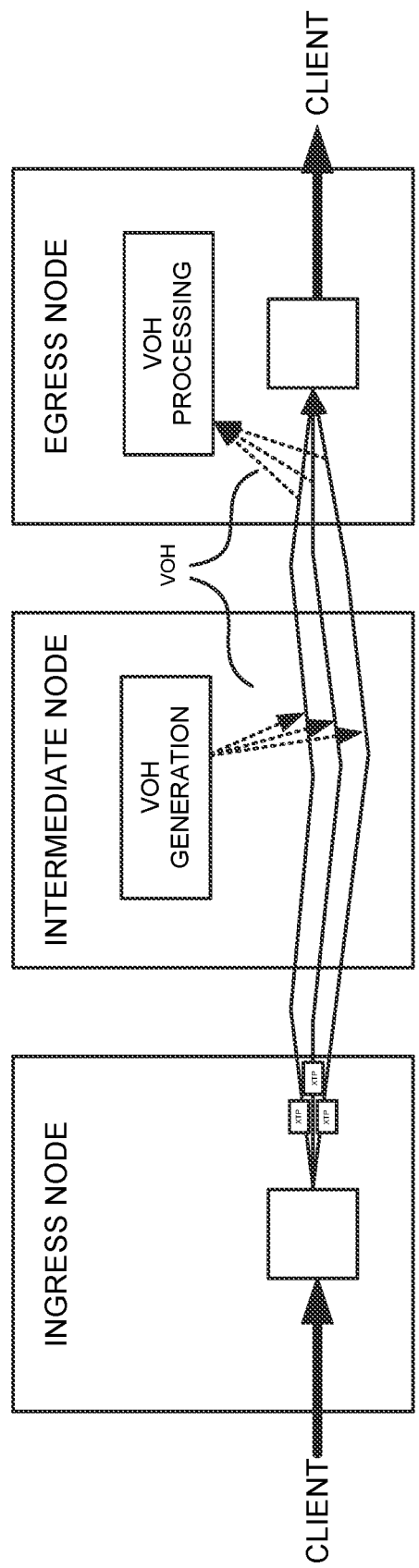
FIG. 16 is a diagram of a further example of transporting client data of a client signal through an optical network.

FIG. 16 is a diagram of a further example of transporting client data of a client signal through an optical network. FIG. 16 shows a simplified view of an optical network that includes three nodes: an ingress node, an intermediate node, and an egress node. In this example, VOH data is generated at the intermediate node rather than at the ingress node. There may be many reasons why the intermediate node may generate VOH data, as described in this example. For example, it may be desired to monitor part of the path between the ingress node and the egress node, rather than the entire path. In this case, an intermediate node may generate VOH data that may be processed either by another intermediate node (not shown in FIG. 16) or by the egress node.

The tributary module, of the ingress node, may receive client data of the client signal, where the client signal has an arbitrary rate. The tributary module may asynchronously map the client data (including original client overhead data) into a collection of first frames, called XTP frames (e.g., see FIG. 5) (shown as three XTP frames in FIG. 16). The XTP frames have a particular, constant length, and a fixed rate (which is independent of the rate of the client signal). Each XTP frame may use a combination of variable and fixed stuff locations to compensate for the different rate of the client signal. The XTP frames are the vehicles for transporting the client data across the optical network in a manner such that the client data is opaque to the intermediate node.

The tributary module, of the ingress node, may output the XTP frames to an egress line module for transmission on the optical network. The egress line module may asynchronously map the XTP frames into one or more second frames, called XTF frame(s) (e.g., see FIG. 6), for transmission on the optical network. The XTF frame has a particular, constant length, and a fixed nominal rate (which is independent of the rate of the client signal and the rate of the XTP frame) that may differ slightly from XTF frame-to-XTF frame. Each XTF frame may use a variable stuff location to compensate for the different rate of the XTP frame. Each XTF frame may also use a pointer that identifies the start of the XTP frame within the payload of the XTF frame. The egress line module may transmit the XTF frame on an optical link to a next hop node (i.e., the intermediate node).

The ingress line module, of the intermediate node, may receive the XTF frame(s) and extract the XTP frames. The ingress line module may generate VOH data and insert the VOH data in the overhead section of the XTP frames. The ingress line module may output the XTP frames to an egress line module for transmission on the optical network.

The egress line module, of the intermediate node, may receive the XTP frames and asynchronously map the XTP frames into one or more XTF frames for transmission on the optical network. The intermediate node may not recover the client data and, thus, need not be aware of the client data being transported in the XTP frames. The intermediate node may operate only upon the XTP frame—performing one level of mapping of the XTP frame out of and into an XTF frame. The intermediate node may transmit the XTF frame on an optical link to a next hop node (i.e., the egress node). Because the intermediate node need not recover the client data, the hardware and software logic at the intermediate nodes can be greatly simplified.

The ingress line module, of the egress node, may receive the XTF frame and extract the XTP frame. The ingress line module may extract the VOH data from the XTP frames, process the VOH data, as necessary, and discard the VOH data. The ingress line module may output the XTP frames to a tributary module for transmission to a client device.

The tributary module may receive the XTP frames and use the pointers (that refer to the start of the XTP frame(s) within an XTF frame) to concatenate and realign the XTP frames associated with a same client signal (which, as described above, has been mapped into multiple XTP frames). The tributary module may then extract the client data from the XTP frames. The tributary module may transmit the client data to a client device.

CONCLUSION

Implementations described herein may facilitate communication of client data, of a client signal, across a network while reducing network complexity. For example, client data of a client signal, of any arbitrary rate, may be asynchronously wrapped into a structure that is used as the vehicle for transporting the client data. Intermediate nodes in the network operate upon the structure and not the client data and, thus, need not recover the client data. Even though the intermediate nodes do not recover the client data, the overhead data of the client data is available to the intermediate nodes because this overhead data is available in the overhead section of the structure that carries the client data. This simplifies the logic required in the intermediate nodes.

The structure used to carry the client data, of a client signal, may further be asynchronously mapped into additional structures that ease the transfer of the structures within a node and through the network. Each structure may have its own rate, which may differ from the rate of the client signal. As a result, there is no need to synchronize clocks within a node or at different nodes in the network.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7, 10, and 12, the order of the blocks may be modified in other implementations. Further, non-dependent blocks may be performed in parallel.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network, comprising:
   an ingress node configured to:
   receive client data, the client data including a client overhead section and a client payload section,
   copy data, as virtual overhead data, from the client overhead section of the client data,
   map the client data into a plurality of frames, each of the plurality of frames including a frame overhead section and a frame payload section, the frame payload section including the client data,
   generate a plurality of optical subcarriers, each of which carrying information associated with each of the plurality of frames; and
   an egress node configured to:
   receive the plurality of optical subcarriers from the ingress node;
   extract the virtual overhead data from the information,
   recover the client overhead data based on the virtual overhead data,
   recover the client data,
   insert the recovered client overhead data into the client overhead section of the client data, and
   output the client data with the recovered client overhead data.

2. The network of claim 1, where the ingress node is further configured to:
   map the frame into a second frame, the second frame including a second overhead section and a second payload section, the second payload section including the frame, and
   where, when outputting the frame on the network, the ingress node is configured to output the frame within the second frame.

3. The network of claim 2, where, when mapping the frame into the second frame, the ingress node is configured to asynchronously map the frame into the second frame.

4. The network of claim 2, where a rate of the client data, a rate of the frame, and a rate of the second frame are independent of each other.

5. The network of claim 2, where the second frame includes a variable stuff location that compensates for a difference between a rate of the frame and a rate of the second frame, where the variable stuff location selectively stores the client data, where the second frame includes no fixed stuff location.

6. The network of claim 2, where the intermediate node is further configured to:
   receive the second frame,
   extract the frame from the second frame, and
   map the frame into a third frame, the third frame including a third overhead section and a third payload section, the third payload section including the frame, and where, when outputting the frame on the network, the intermediate node is configured to output the frame within the third frame.

7. The network of claim 6, where the egress node is further configured to:
   receive the third frame, and
   extract the frame from the third frame.

8. The network of claim 1, where a rate of the client data is independent of a rate of the frame.

9. The network of claim 1, where the frame includes a combination of a fixed stuff location and a variable stuff location that compensate for a difference between a client rate of the client data and a rate of the frame, where the fixed stuff location does not store the client data and the variable stuff location selectively stores the client data.

10. The network of claim 1, where only the ingress node maps the client data into the frame, and only the egress node recovers the client data from the frame.

11. The network of claim 1, where, when mapping the client data into the frame, the ingress node is configured to asynchronously map the client data into the frame.

12. The network of claim 1, where, when processing the virtual overhead data, the ingress node is configured to perform operations relating to monitoring all or part of a path used for transporting the client data.

13. The network of claim 1, where, when processing the virtual overhead data, the ingress node is configured to generate overhead data as the processed virtual overhead data.

14. A method performed in a network including at least a first node, a second node, and a third node, the method comprising:
   receiving, by the first node, client data that includes a client overhead section and a payload section;
   copying data, as virtual overhead data, from the client overhead section;
   encapsulating the client data in a frame that includes a frame overhead section and a frame payload section, the client data being encapsulated in the frame payload section;
   storing the virtual overhead in the frame;

generating a plurality of optical subcarriers, one of which carrying information indicative of the frame;

transmitting the plurality of optical subcarriers to the second node;

detecting at least said one of the plurality of optical subcarriers at the second node;

extracting the virtual overhead data from the frame;

recovering the client overhead data from the extracted virtual overhead data;

recovering the client data from the frame;

replacing the data in the client overhead section of the client data with the recovered client overhead data; and outputting the client data with the recovered client overhead data.

15. The method of claim 14, where encapsulating the client data in the frame includes asynchronously encapsulating the client data in the frame.

16. The method of claim 14, where a rate of the client data and a rate of the frame are independent of each other.

17. The method of claim 14, further comprising:

mapping the frame into another frame, where a rate of the frame and a rate of said another frame are independent of each other.

18. The method of claim 17, where transmitting the frame to the second node includes transmitting the other frame to the second node;

where the method further comprises:

receiving, by the second node, the other frame; and recovering the frame from the other frame.

19. The method of claim 14, where the frame includes a combination of a fixed stuff location and a variable stuff location, where the fixed stuff location does not store the client data and the variable stuff location selectively stores the client data.

20. The method of claim 14, where processing the virtual overhead data includes performing, based on the virtual overhead data, operations relating to monitoring at least a portion of a path used to transport the client data through the network.

21. The method of claim 14, where replacing the data in the client overhead section of the client data with the recovered client overhead data includes replacing all of the data in the client overhead section of the client data with the recovered client overhead data.

22. The method of claim 14, where replacing the data in the client overhead section of the client data with the recovered client overhead data includes replacing less than all of the data in the client overhead section of the client data with the recovered client overhead data.

* * * * *